(12) United States Patent
Fang et al.

(10) Patent No.: US 8,690,494 B2
(45) Date of Patent: Apr. 8, 2014

(54) CUTTING INSERTS AND CUTTING TOOL SYSTEMS HAVING SINUSOIDAL AND HELICAL CUTTING EDGES

(75) Inventors: X. Daniel Fang, Brentwood, TN (US); Frederick John Palmer, Warwickshire (GB); Jean-Luc Dufour, Franklin, TN (US); David J. Wills, Franklin, TN (US)

(73) Assignee: Kennametal Inc., Latrobe, PA (US)

( * ) Notice: Subject to any disclaimer, the term of this patent is extended or adjusted under 35 U.S.C. 154(b) by 206 days.

(21) Appl. No.: 13/206,558

(22) Filed: Aug. 10, 2011

(65) Prior Publication Data

US 2013/0039705 A1 Feb. 14, 2013

(51) Int. Cl.
*B23C 5/02* (2006.01)

(52) U.S. Cl.
CPC .................................... *B23C 5/02* (2013.01)
USPC ............... 407/61; 407/63; 407/42; 407/113

(58) Field of Classification Search
USPC ........... 407/34, 42, 55, 56, 58, 59, 61, 62, 63, 407/113, 114
IPC ............................... B23C 5/00,5/02, 5/10, 5/20
See application file for complete search history.

(56) References Cited

U.S. PATENT DOCUMENTS

| | | | | | |
|---|---|---|---|---|---|
| 4,182,587 | A | * | 1/1980 | Striegl | 407/113 |
| 4,215,955 | A | * | 8/1980 | Lillie | 407/42 |
| 4,655,648 | A | * | 4/1987 | Hellbergh | 407/42 |
| 4,790,693 | A | * | 12/1988 | Koblesky | 407/35 |
| 4,936,719 | A | * | 6/1990 | Peters | 407/42 |
| 5,586,843 | A | * | 12/1996 | Minicozzi | 407/42 |
| 6,659,694 | B1 | * | 12/2003 | Asbell et al. | 407/40 |
| 6,773,209 | B2 | * | 8/2004 | Craig | 407/63 |
| 7,563,059 | B2 | * | 7/2009 | Song | 407/53 |
| 2007/0217873 | A1 | * | 9/2007 | Martin et al. | 407/49 |

FOREIGN PATENT DOCUMENTS

EP 1442852 A1 * 8/2004
SU 1634372 A * 3/1991

* cited by examiner

*Primary Examiner* — Daniel Howell
*Assistant Examiner* — Alan Snyder
(74) *Attorney, Agent, or Firm* — Larry R. Meenan, Esq.

(57) ABSTRACT

A cutting tool system is designed to have a combined sinusoidal-shaped and helical-shaped cutting edge formed by an assembly of aligned common cutting inserts each having a sinusoidal and helical cutting edge.

28 Claims, 23 Drawing Sheets

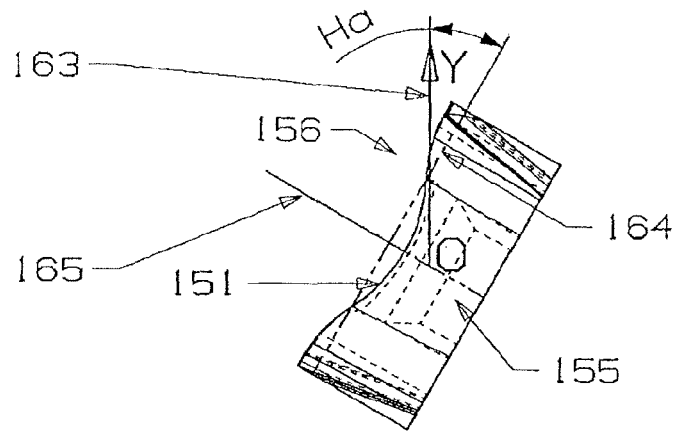
Fig. 15(a)
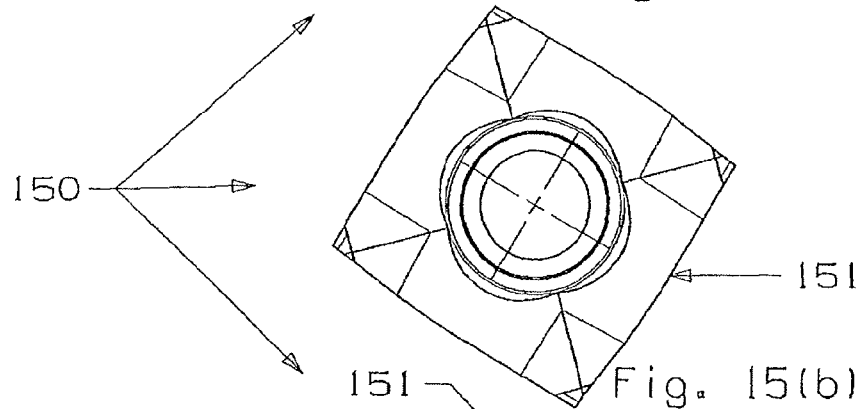
Fig. 15(b)
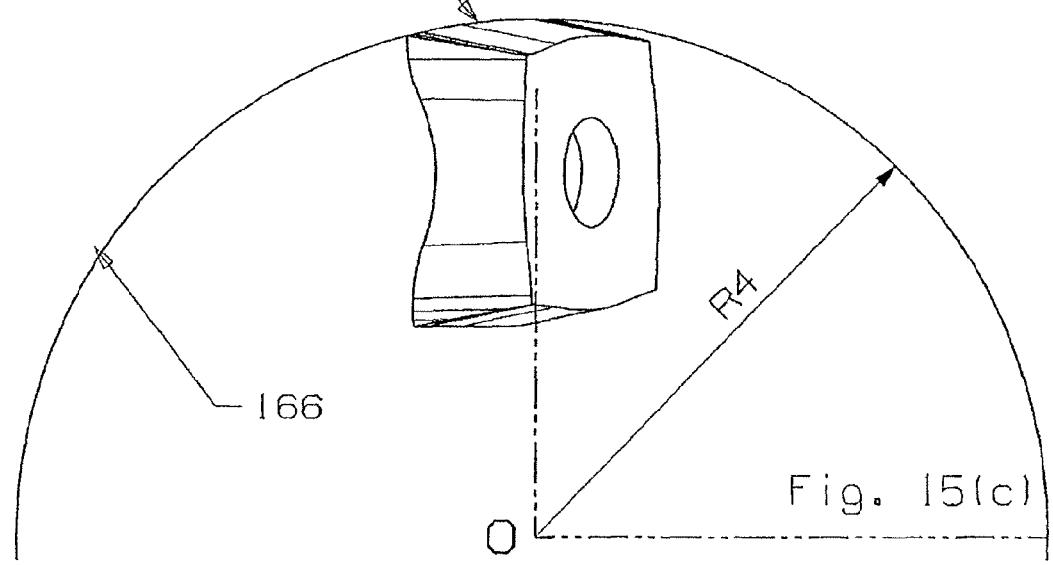
Fig. 15(c)
FIGURE 15

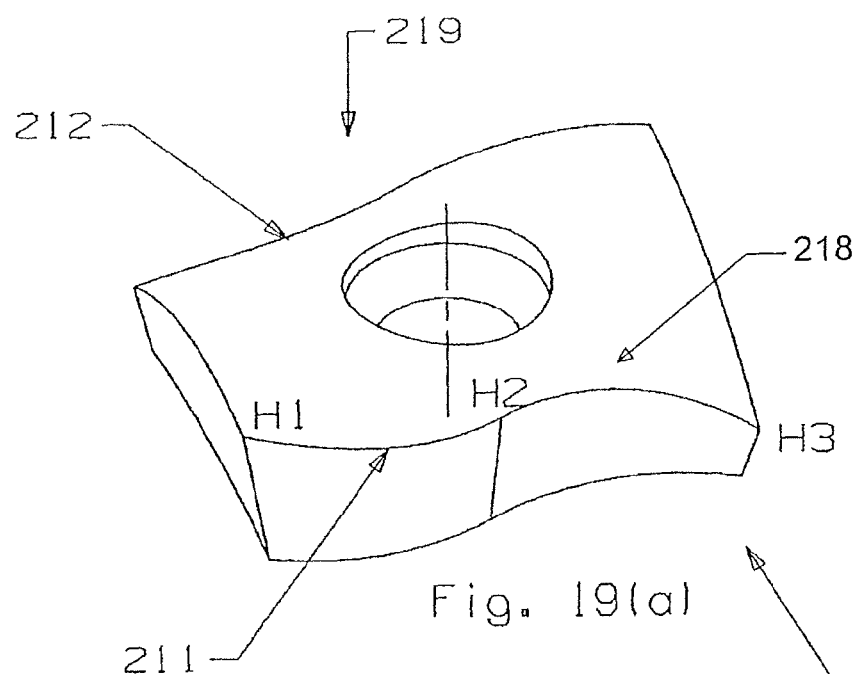
Fig. 19(a)
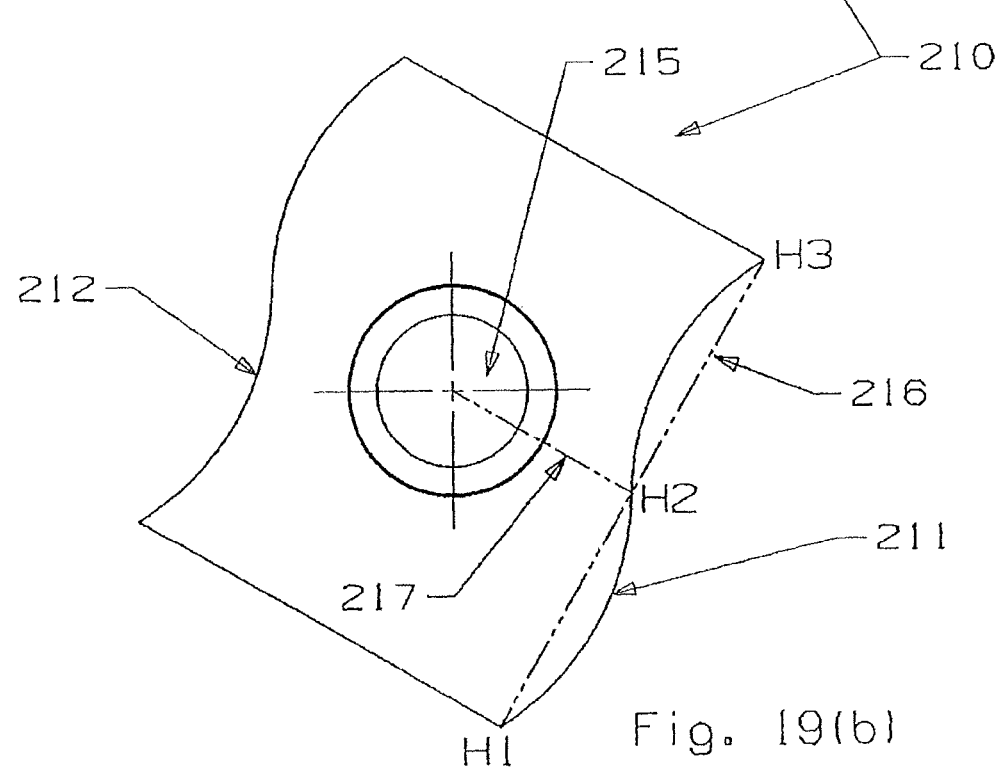
Fig. 19(b)
FIGURE 19

CUTTING INSERTS AND CUTTING TOOL SYSTEMS HAVING SINUSOIDAL AND HELICAL CUTTING EDGES

TECHNICAL FIELD

This disclosure generally relates to cutting tools, including cutting tool holders and cutting inserts. In particular, this disclosure relates to indexable and replaceable cutting inserts and to tool holders configured to engage and secure indexable and replaceable cutting inserts such as, for example, inserts and holders for rotary machining tool systems.

BACKGROUND

Indexable cutting inserts for cutting tools include, for example, cutting inserts made of carbide, ceramic, coated carbide, coated ceramic, or other hard materials. Cutting inserts generally have a unitary structure and one or more cutting edges located at various corners or around peripheral edges of the inserts. Indexable cutting inserts are mechanically secured to a tool holder, but the inserts are adjustable and removable in relation to the tool holder. Indexable cutting inserts may be readily re-positioned (i.e., indexed) to present a new cutting edge to engage a workpiece, or indexable cutting inserts may be replaced in a tool holder when the cutting edges dull or fracture, for example. In this manner, indexable insert cutting tools are modular cutting tool assemblies that include at least one cutting insert and a tool holder.

Indexable insert cutting tool systems comprising a tool holder and one or more replaceable and/or indexable cutting inserts are generally more economical than unitary cutting tools. This is so because indexable insert cutting tool systems allow for the indexing and replacement of worn and/or damaged cutting edges/surfaces, whereas unitary cutting tools require scrapping the entire cutting tool when worn out or damaged. However, for rotary cutting tools that require complex cutting edge configurations along the longitudinal axis of the tool, such as, for example, milling and other rotary machining tools, unitary cutting tools are less complex to design and manufacture than indexable insert cutting tool systems. This is so because the cutting edge configuration of an indexable insert cutting tool system must be formed by an assembly of separate cutting inserts as opposed to a continuous and unitary piece of shaped material.

SUMMARY

In a non-limiting embodiment, a cutting insert comprises at least one sinusoidal and helical cutting edge.

In another non-limiting embodiment, a cutting tool system comprises a tool holder and a plurality of common cutting inserts. The tool holder comprises a plurality of common insert pockets positioned in a helical orientation about a longitudinal axis of the tool holder. The plurality of common cutting inserts are removably attachable to the plurality of common insert pockets in the tool holder. When so attached, the plurality of common cutting inserts form at least one cutting flute on the tool holder. The at least one cutting flute comprises a helical grouping of common cutting inserts positioned in the insert pockets. The common cutting inserts each comprise at least one sinusoidal and helical cutting edge. The at least one cutting flute comprises a sinusoidal and helical cutting edge positioned about the longitudinal axis of the tool holder. The sinusoidal and helical cutting edge of the at least one cutting flute is formed by alignment of the individual sinusoidal and helical cutting edges of the common cutting inserts that comprise the at least one cutting flute.

In another non-limiting embodiment, a cutting tool system comprises a tool holder and a plurality of common cutting inserts. The tool holder comprises two or more series of common insert pockets. Each series of common insert pockets is positioned in a helical orientation about a longitudinal axis of the tool holder. The plurality of common cutting inserts are removably attachable to the common insert pockets in the tool holder. When so attached, the plurality of common cutting inserts form two or more cutting flutes on the tool holder. The two or more cutting flutes each comprise a helical grouping of the common cutting inserts positioned in the insert pockets. The common cutting inserts each comprise at least one sinusoidal and helical cutting edge. The two or more cutting flutes each comprise a sinusoidal and helical cutting edge positioned about the longitudinal axis of the tool holder. The sinusoidal and helical cutting edges of the two or more cutting flutes are formed by alignment of the individual sinusoidal and helical cutting edges of the common cutting inserts that comprise the two or more cutting flutes.

It is understood that the invention disclosed and described in this specification is not limited to the embodiments summarized in this Summary.

BRIEF DESCRIPTION OF THE DRAWINGS

Various features and characteristics of the non-limiting and non-exhaustive embodiments disclosed and described in this specification may be better understood by reference to the accompanying figures, in which:

FIG. 9 shows three views of a cutting insert having two indexable cutting edges and configured to be used as an end-face cutting insert in combination with the cutting inserts as shown in FIGS. 1-6 and 8, in which FIG. 9(a) is a top view of the end cutting insert, FIG. 9(b) is a view from the direction indicated by arrow HH in FIG. 9(a), and FIG. 9(c) is a view from the direction indicated by arrow VV in FIG. 9(a);

FIG. 10 shows schematic diagrams illustrating the relative positioning of a series of common cutting inserts (as shown in FIGS. 1-6 and 8) and a different end-face cutting insert (as shown in FIG. 9), positioned as if the cutting inserts were assembled and secured to a rotary tool holder (not shown) to form a cutting flute comprising the series of common cutting inserts and having a cutting edge comprising a sinusoidal and helical geometric shape, in which FIG. 10(a) is a side view schematic diagram of the cutting flute and FIG. 10(b) is an end view schematic diagram of the cutting flute;

FIG. 11 shows schematic diagrams illustrating the relative positioning of a series of different-sized end-face cutting inserts (similar to the end-face cutting insert shown in FIG. 9), positioned as if the end-face cutting inserts where assembled and secured to a rotary tool holder (not shown) configured to comprise five cutting flutes, in which FIG. 11(a) is a side view schematic diagram of the assembly and FIG. 11(b) is an end view schematic diagram of the assembly;

FIG. 12 shows schematic views illustrating the relative positioning of five cutting flutes, each flute comprising a different-sized end-face cutting insert (as shown in FIGS. 9 and 11) and a series of common cutting inserts (as shown in FIGS. 1-6 and 8), positioned as if the cutting inserts were assembled and secured to a rotary tool holder (not shown), and each cutting flute having a cutting edge comprising a sinusoidal and helical geometric shape, in which FIG. 12(a) is an end view schematic diagram of the five cutting flutes and FIG. 12(b) is a side view schematic diagram of the five cutting flutes;

FIG. 13 shows two views of an indexable insert cutting tool system comprising a tool holder comprising five cutting flutes, each cutting flute comprising a different-sized end cutting insert (as shown in FIGS. 9 and 11) and a series of common cutting inserts (as shown in FIGS. 1-6 and 8), and each cutting flute having a cutting edge comprising a sinusoidal and helical geometric shape, in which FIG. 13(a) is an end view of the cutting tool system and FIG. 13(b) is a side view of the cutting tool system;

FIG. 14 shows three views of a cutting insert comprising four indexable cutting edges, each cutting edge comprising a sinusoidal and helical geometric shape, in which FIG. 14(a) is a top view of the cutting insert, FIG. 14(b) is a side view of the cutting insert, and FIG. 14(c) is a three-dimensional perspective view of the cutting insert;

FIG. 15 shows schematic diagrams of the cutting insert shown in FIG. 14 illustrating the geometrical positioning of the cutting insert relative to a coordinate system, positioned as if the cutting insert were secured on a rotary tool holder (not shown), in which FIG. 15(a) is a side view schematic diagram, FIG. 15(b) is a top view schematic diagram, and FIG. 15(c) is a perspective view schematic diagram;

FIG. 16 shows schematic diagrams illustrating the relative positioning of a series of common cutting inserts (as shown in FIGS. 14 and 15), positioned as if the cutting inserts were assembled and secured to a rotary tool holder (not shown) to form a cutting flute comprising the series of cutting inserts and having a cutting edge comprising a sinusoidal and helical geometric shape, in which FIG. 16(a) is a side view schematic diagram of the cutting flute and FIG. 16(b) is an end view schematic diagram of the cutting flute;

FIG. 17 shows schematic diagrams illustrating the relative positioning of a common cutting insert having two indexable cutting edges and a different end-face cutting insert having two indexable cutting edges, positioned as if the cutting inserts were assembled and secured to a rotary tool holder (not shown) to form a cutting flute comprising the cutting inserts and forming a cutting edge comprising a sinusoidal and helical geometric shape, in which FIG. 17(a) is an end view schematic diagram of the cutting flute and FIGS. 17(b) and 17(c) are side view schematic diagrams of the cutting flute;

FIG. 18 shows two views of a cutting insert comprising two indexable cutting edges, each cutting edge comprising a sinusoidal and helical geometric shape, in which FIG. 18(a) is a three-dimensional perspective view of the cutting insert and FIG. 18(b) is a top view of the cutting insert;

FIG. 19 shows two views of a cutting insert comprising two indexable cutting edges, each cutting edge comprising a sinusoidal and helical geometric shape, in which FIG. 19(a) is a three-dimensional perspective view of the cutting insert and FIG. 19(b) is a top view of the cutting insert;

Figure 1:
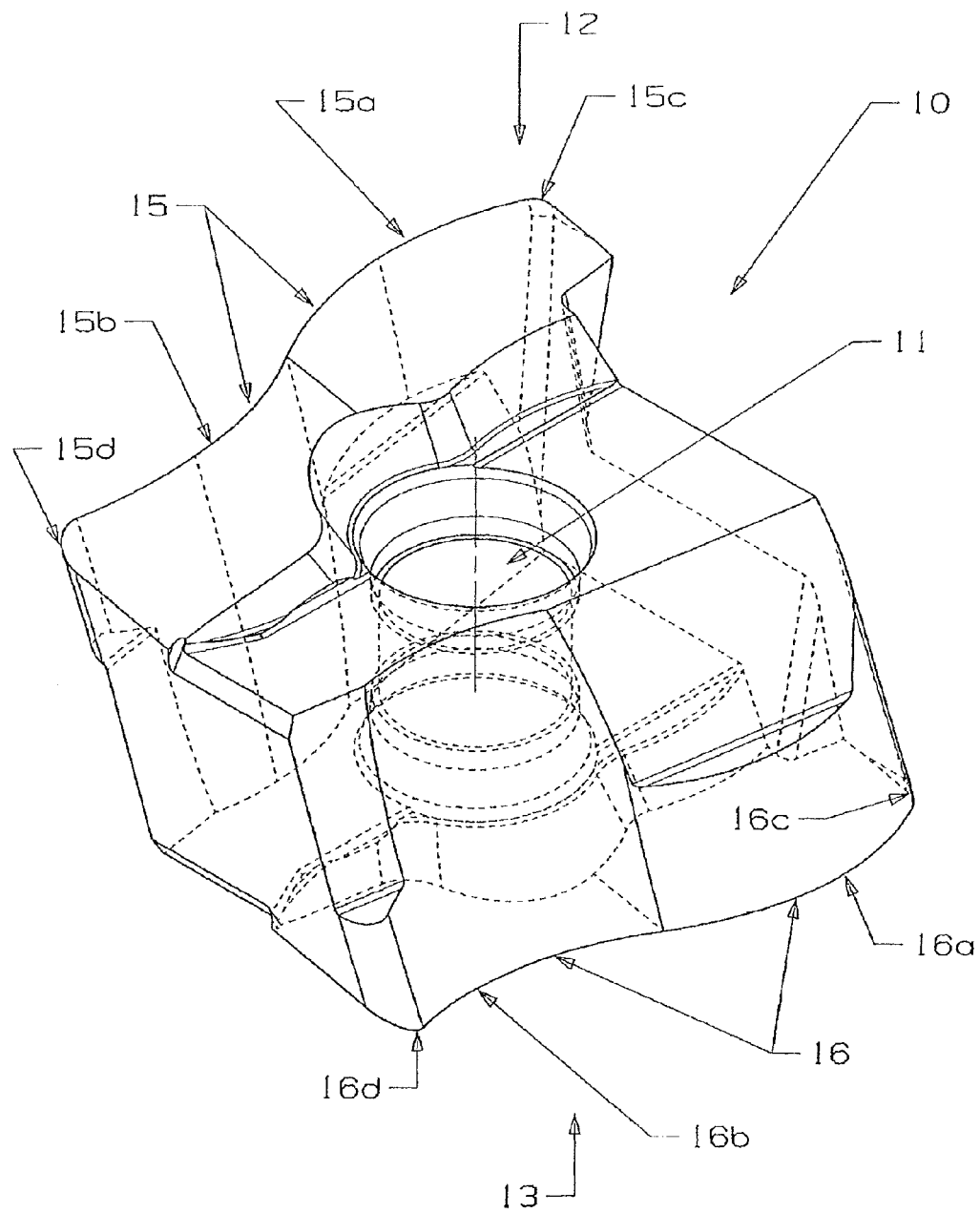
FIG. 1 is a three-dimensional perspective view of a cutting insert comprising two indexable cutting edges, each cutting edge comprising a sinusoidal and helical geometric shape.

The reader will appreciate the foregoing details, as well as others, upon considering the following detailed description of various non-limiting and non-exhaustive embodiments according to this specification.

DESCRIPTION

Various embodiments are described and illustrated in this specification to provide an overall understanding of the structure, function, operation, manufacture, and use of the disclosed cutting inserts and cutting tool systems. It is understood that the various embodiments described and illustrated in this specification are non-limiting and non-exhaustive. Thus, the invention is not necessarily limited by the description of the various non-limiting and non-exhaustive embodiments disclosed in this specification. The features and characteristics illustrated and/or described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant(s) reserve the right to amend the claims to affirmatively disclaim features or characteristics that may be present in the prior art. Therefore, any such amendments comply with the requirements of 35 U.S.C. §112, first paragraph, and 35 U.S.C. §132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing description, definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicants reserve the right to amend this specification to expressly recite any subject matter, or portion thereof, incorporated by reference herein.

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

In rotary cutting and machining tools, a helical cutting edge gradually engages a workpiece to the full length of the cutting edge, and gradually disengages from the workpiece as material is cut and removed. The cutting action from a helical cutting edge results in a smooth cut and evenly distributed stresses along the cutting edge. In contrast, a straight cutting edge engages a workpiece along the full length of the cutting edge at the same time. This abrupt engagement causes a rapid cutting tooth load, which may cause undesirable vibrations and tool "chatter."

However, for cutting tools comprising indexable cutting inserts, if the arrangement of the multiple cutting inserts assembled and aligned on the tool holder does not form a continuous cutting edge having a true helical geometric shape, the modular cutting tool may create a rough surface finish and/or stepped/wavy surface topology on the machined surface. It is difficult to produce a cutting edge having a continuous and true helical geometric configuration on modular rotary cutting tools comprising multiple cutting inserts because the length of the cutting edge is formed by the respective cutting edges of the multiple individual cutting inserts when assembled in the tool holder.

The uneven and rough surface topology of a cut made with a modular rotary cutting tool comprising a cutting flute comprising a series of cutting inserts may be offset, in part, by another cutting flute comprising another series of multiple cutting inserts. However, if the cutting edges of the flutes, which are formed by the cutting edges of the multiple individual cutting inserts comprising the cutting flutes, are not in a true helical form, the uneven and rough surface topology will never be completely offset. This problem is even more pronounced with cutting inserts having sinusoidal or wavelike cutting edges because the non-linear and non-arcuate cutting edge pattern can create undulations in a machined surface, particularly when the individual cutting inserts are out of alignment.

Solid (i.e., unitary, one-piece) end mills having cutting edges having sinusoidal or wavelike patterns from one end of the cutting portion to the other along a perspective helical path may significantly improve cutting action and increase tool life in rotary milling applications. Examples of such solid end mills are described in U.S. Pat. Nos. 4,212,568; 4,560,308; 5,610,232; 7,563,059; and 7,588,396, which are incorporated by reference herein. However, the unitary construction of these end mills facilitates the formation of true helical configurations because there are no indexable or removal parts that create alignment problems, which prevent the formation of a helical cutting edge on a multi-insert cutting flute.

U.S. Pat. Nos. 5,221,164; 5,772,365; and 7,101,122 describe cutting inserts having wavelike patterns on the individual inserts. However, the inserts described in these references are not structurally capable of being assembled into a cutting flute positioned along and about the length of a cutting tool holder. Therefore, these inserts cannot form a true helical cutting edge. U.S. Pat. Nos. 6,773,209 and 6,811,359 describe the problems encountered on machined surfaces caused by a rotary milling operation using non-helical cutting tools. These patents describe a helical cutting system comprising individual cutting inserts having linear/arcuate cutting edges. However, these patents do not define the purported helical cutting edge mathematically or quantitatively and, therefore, do not enable the general design of cutting flutes comprising indexable inserts and true helical cutting edges.

As defined in *Machinery's Handbook*, 26th Edition, Industrial Press Inc., New York, 2000 (which is incorporated by reference herein) a helix is a curve generated by a point moving about a cylindrical surface (real or imaginary) at a constant rate in the direction of the cylinder's longitudinal axis. Therefore, geometrically, a helix is a spiral-shaped curve in three-dimensional space. A helix has the property that a tangent line at any point along the helix curve has a constant angle with respect to a fixed line in space. When the fixed line is the central longitudinal axis of the helix, the constant angle is defined as the "helix angle." A helix may be defined parametrically in Cartesian and cylindrical coordinate systems as follows:

| Cartesian coordinates | Cylindrical coordinates |
| --- | --- |
| $x(t) = a \cos(t)$; | $r(t) = a$ |
| $y(t) = a \sin(t)$; | $\theta(t) = t$ |
| $z(t) = bt$ | $h(t) = bt$ |

Figure 22:
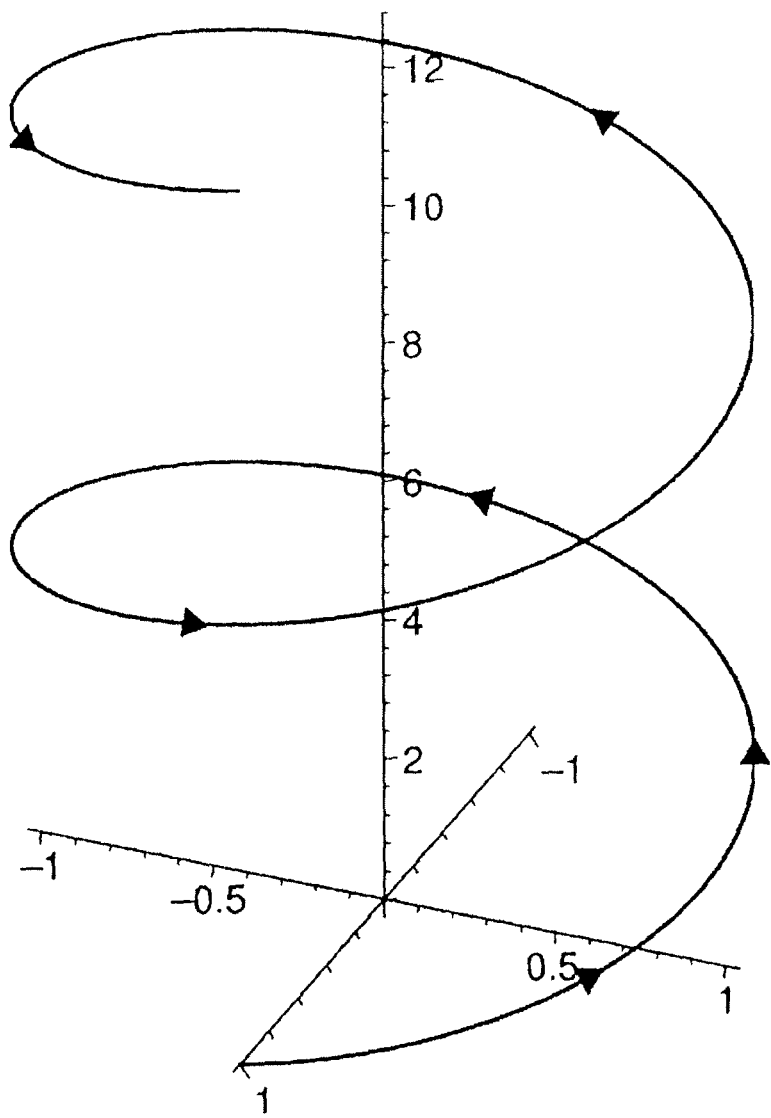
FIG. 22 is a schematic diagram of an embodiment of a helix.

In a right-handed Cartesian coordinate system, as the parameter t increases, the point $(x(t), y(t), z(t))$ traces a right-handed helix of radius a and pitch $2\pi b$ about the z-axis, which is parallel and coincident (i.e., co-linear) with the longitudinal axis of the helix. The pitch of a helix is the length of one complete helix turn measured parallel to the axis of the helix. Referring to FIG. 22, a cylindrical helix is shown in which $a=1$ and $b=1$. The helix is shown with increasing parameter t from $t=0$ to $t=4\pi$ (i.e., through two pitches of the helix). In a cylindrical coordinate system, as the parameter t increases, the point $(r(t), \theta(t), h(t))$ traces a right-handed helix of radius a and pitch $2\pi b$ about the h-axis, which is co-linear with the longitudinal axis of the helix.

As used herein, the terms "helix" and "helical" refer to cylindrical helixes, i.e., helixes having a constant radius about a central longitudinal axis. A true helical cutting edge may be defined as a three-dimensional curved cutting edge in which each point on the cutting edge is located at the same perpendicular distance to the central longitudinal axis of the rotary cutting tool (i.e., the cutting axis), within acceptable tolerances. This perpendicular distance is the cutting radius of the rotary cutting tool, which is constant along the cutting length of the cutting tool. Therefore, each point on a helical cutting edge is located on a conceptual cylindrical surface having a diameter of two times the cutting radius of the rotary cutting tool.

A helical cutting edge may be conceptually developed by moving a point at a constant rate in the longitudinal direction of the cutting axis and at a constant circumferential rate, while maintaining a constant distance (equal to the cutting radius) from the central longitudinal axis (i.e., the cutting axis) of a cutting tool holder. A cutting edge designed in this manner is a true helical cutting edge and would not create uneven or rough machined surface topology, provided that the cutting edge maintains a true helical shape. This would result in a smooth and accurate cutting path in rotary machining applications, for example. Further, combining a sinusoidal curve component with a helical curve component in a single cutting edge configuration would not prevent smooth and accurate cutting paths because each point of the cutting edge would still coincide with the cutting radius.

The various non-limiting embodiments disclosed and described in this specification are directed, in part, to cutting inserts comprising at least one sinusoidal and helical cutting edge, and to cutting tool systems comprising the inserts, in which the assembly of the inserts on a tool holder forms a cutting flute comprising a sinusoidal and helical cutting edge. As used herein, the term "sinusoidal and helical cutting edge(s)" refers to the cutting edge portions of a cutting insert that engage a workpiece and cut material from the workpiece, in which the cutting edges have a geometric shape comprising a sinusoidal curve component and a helical curve component. As used herein, the term "sinusoidal and helical cutting edge(s)" also refers to the cutting edge portions of a cutting flute comprising an assembly of cutting inserts, in which the cutting edges of the cutting flute have a geometric shape comprising a sinusoidal curve component and a helical curve component.

Therefore, it is understood that the sinusoidal and helical cutting edge(s) of a cutting flute are formed by the alignment of the sinusoidal and helical cutting edge(s) of individual cutting inserts helically positioned in a tool holder. In addition, it is understood that the sinusoidal and helical cutting edge(s) described in this specification comprise a combined sinusoidal and helical geometric shape within generally acceptable tolerances in the cutting tool industry.

The various non-limiting embodiments disclosed and described in this specification provide the advantage of improved cutting action and increased tool life that result from sinusoidal cutting edges. The various non-limiting embodiments disclosed and described in this specification also provide the advantage of improved surface finish and more accurate machining path that result from true helical cutting edges. Further, these advantages are provided in an indexable cutting tool system in which individual cutting inserts may be indexed or replaced as necessary due to wear or failure. Various non-limiting embodiments disclosed and described in this specification provide a cutting tool system characterized by a combined sinusoidal and true helical cutting edge, which improves the rotary machining of difficult-to-machine materials, such as, for example, titanium and titanium alloys, nickel and nickel alloys, superalloys, and various exotic metals and metallic composites.

The various embodiments disclosed and described in this specification also provide a design method for producing a cutting insert comprising at least one indexable, sinusoidal, and helical cutting edge. This design method creates a mathematical design model that may be used to manufacture cutting inserts having sinusoidal and helical cutting edges that together form a cutting flute having a sinusoidal and helical cutting edge. The various embodiments disclosed and described in this specification also provide a design method for positioning multiple cutting inserts in a tool holder to form a cutting flute comprising a combined sinusoidal and helical cutting edge in a cutting tool system. This design method creates a design model that may be used to machine the insert pockets on a tool holder so that indexable cutting inserts may be assembled together and aligned to form a cutting flute comprising a sinusoidal and helical cutting edge.

FIG. 1 is a three-dimensional perspective view of a cutting insert 10 comprising two indexable cutting edges 15 and 16, each of the cutting edges comprising a sinusoidal and helical cutting edge. The cutting insert 10 includes a center through-hole 11 for removably securing the cutting insert 10 to a tool holder (not shown). The sinusoidal and helical cutting edge 15 is located on the top side 12 of the cutting insert 10. The cutting edge 15 comprises a one-wavelength sinusoidal shape. The cutting edge 15 comprises cutting edges 15a and 15b, which are continuous with each other and each comprise a half-wavelength sinusoidal shape. The cutting edge 15 comprises two optional nose corners 15c and 15d located at the respective ends of the sinusoidal and helical cutting edge 15.

The cutting insert 10 also comprises a second cutting edge 16 located on the bottom side 13 of the cutting insert. The cutting edge 16 comprises a one-wavelength sinusoidal shape. The cutting edge 16 comprises cutting edges 16a and 16b, which are continuous with each other and each comprise a half-wavelength sinusoidal shape. The cutting edge 16 comprises two optional nose corners 16c and 16d located at the respective ends of the sinusoidal and helical cutting edge 16.

The nose corners 15c/15d and 16c/16d are formed from the initial sharp end points of the sinusoidal and helical cutting edges 15 and 16, respectively, in order to prevent the ends of the cutting edges of the insert from being damaged during use in machining processes. The two sinusoidal and helical cutting edges 15 and 16 of the cutting insert 10 are indexable by rotating the insert 180-degrees about an axis perpendicular to the axis of the center through-hole 11 and parallel to the mean line of the sinusoidal curve component of the cutting edges 15 and 16. This indexable feature is illustrated in FIGS. 2 and 3.

Figure 2:
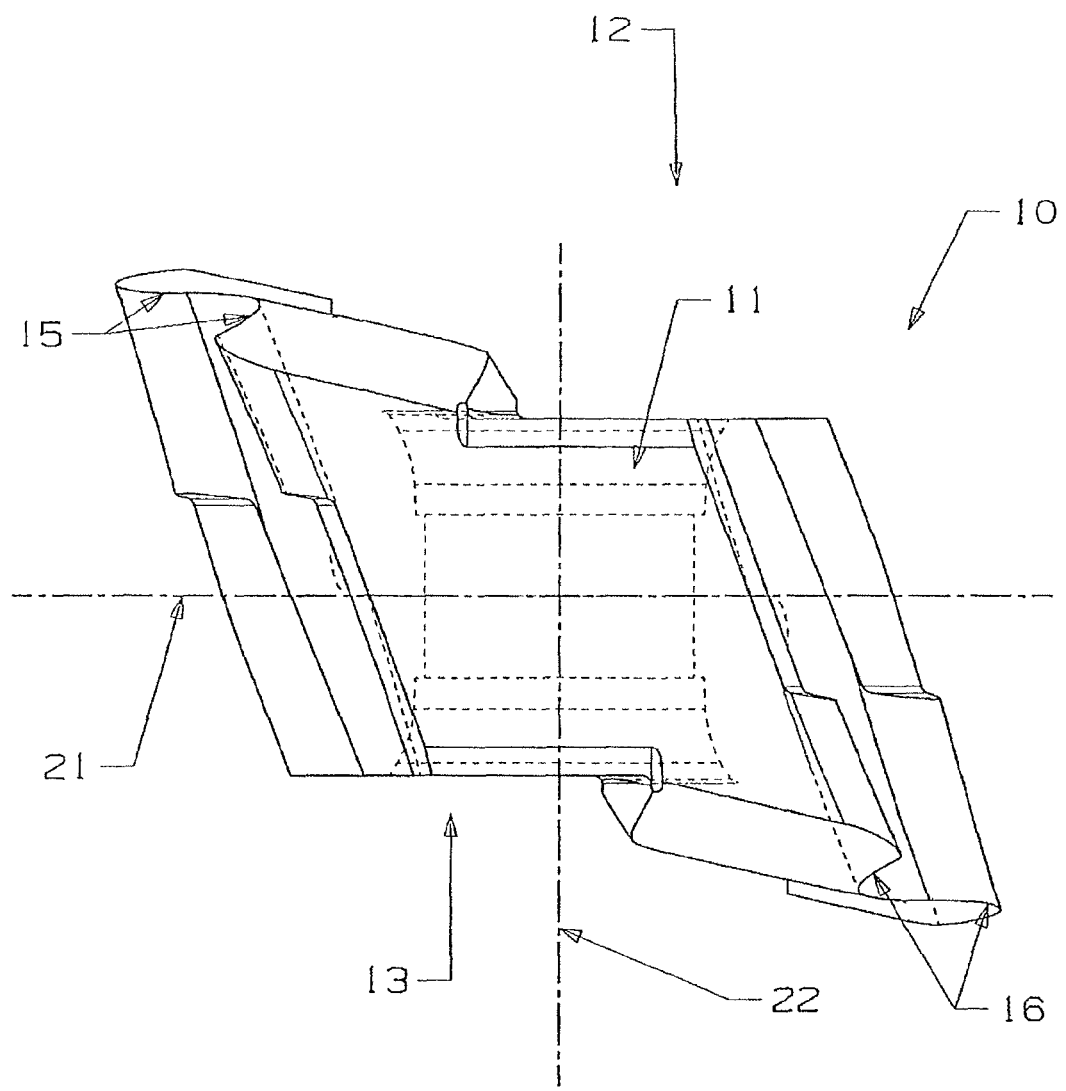
FIG. 2 is an end view of the cutting insert shown in FIG. 1 (viewed from the end shown in perspective in FIG. 1)

FIG. 2 is an end view of the cutting insert 10 shown in FIG. 1 (viewed from the end shown in perspective in FIG. 1). The plane 21 is a middle plane between the top face 12 and the bottom face 13 of the cutting insert 10. The plane 22 is perpendicular to the middle plane 21 and parallel and aligned with the central axis of the center through-hole 11. The cutting insert 10 possesses 180-degree rotational symmetry about the axis defined by the intersection of plane 21 and plane 22. Therefore, the top face 12 and the cutting edge 15 possesses 180-degree rotational symmetry with respect to the bottom face 13 and cutting edge 16, and as such, the two sinusoidal and helical cutting edges 15 and 16 of the cutting insert 10 are indexable by rotating the insert 180-degrees about the axis defined by the intersection of plane 21 and plane 22.

Figure 3:
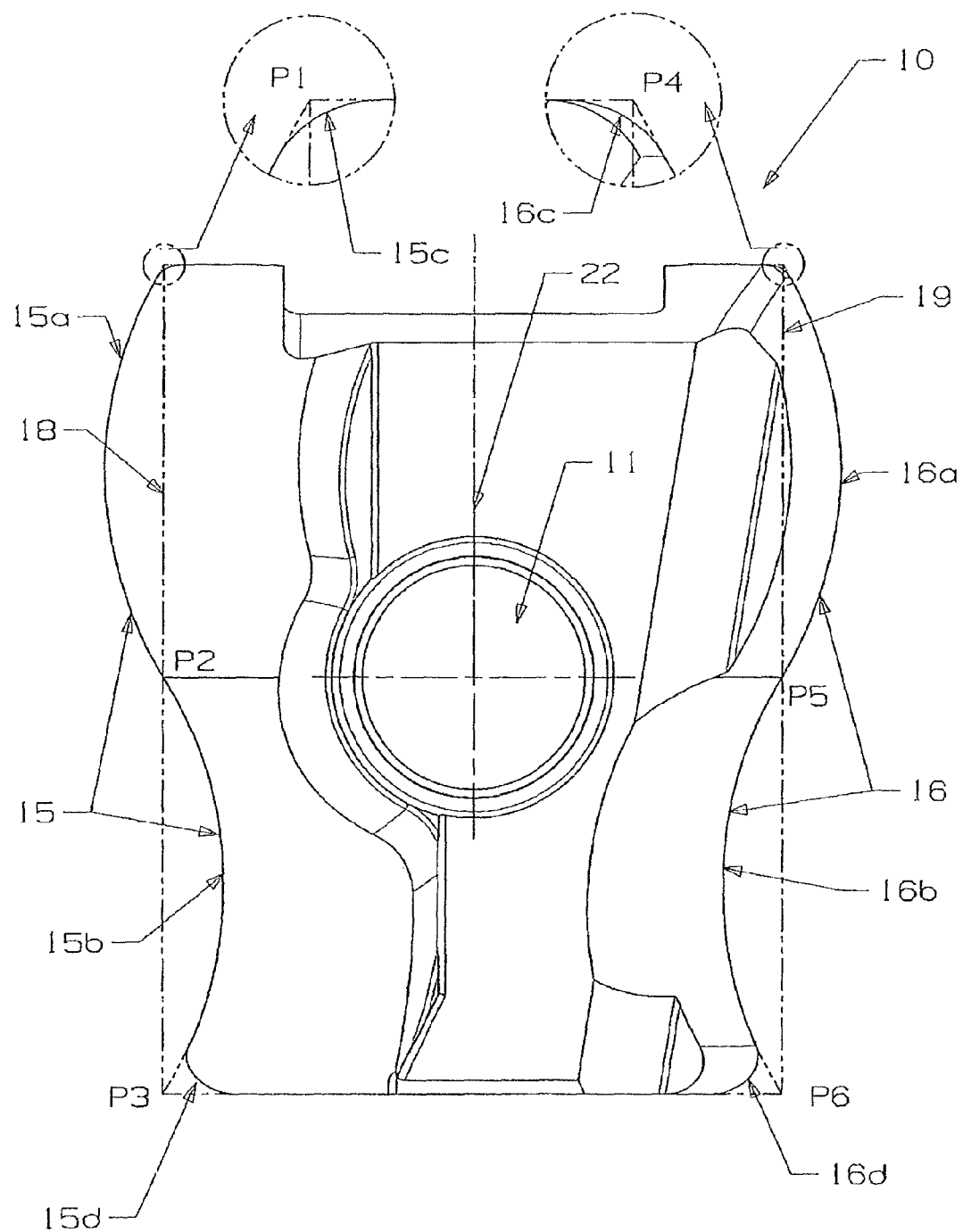
FIG. 3 is a top view, together with two detailed views, of the cutting insert shown in FIGS. 1 and 2.

FIG. 3 is a top view, together with two detailed views, of the cutting insert 10 shown in FIGS. 1 and 2 (viewed from the top face 12 shown in perspective in FIG. 1). The plane 22 is the same as the plane 22 shown in FIG. 2. As shown on the left-hand side of FIG. 3, the sinusoidal and helical cutting edge 15 passes through the points P1, P2, and P3 (in which the points P1 and P3 are located at the ends of the cutting edge before the formation of the nose corner 15d at the end point P3 of the cutting edge 15b and the formation of the nose corner 15c at the end point P1 of the cutting edge 15a). As shown on the right-hand side of FIG. 3, the sinusoidal and helical cutting edge 16 passes through the points P4, P5, and P6 (in which the points P4 and P6 are located at the ends of the cutting edge before the formation of the nose corner 16d at the end point P6 of the cutting edge 16b and the formation of the nose corner 16c at the end point P4 of the cutting edge 16a.

The line 18 is the longitudinal axis of the sinusoidal curve defining, in part, the cutting edge 15 (i.e., the mean line of the sinusoidal curve component), wherein the portion 15a and the portion 15b have the same parameters (i.e., amplitude and wavelength). The line 19 is the longitudinal axis of the sinusoidal curve defining, in part, the cutting edge 16 (i.e., the mean line of the sinusoidal curve component), wherein the portion 16a and the portion 16b have the same parameters (i.e., amplitude and wavelength). Although the geometric parameters of portions 15a and 15b of cutting edge 15 are the same as the geometric parameters of portions 16a and 16b, respectively, of cutting edge 15, it is understood that in various non-limiting embodiments, these portions may not necessarily be the same.

Figure 4:
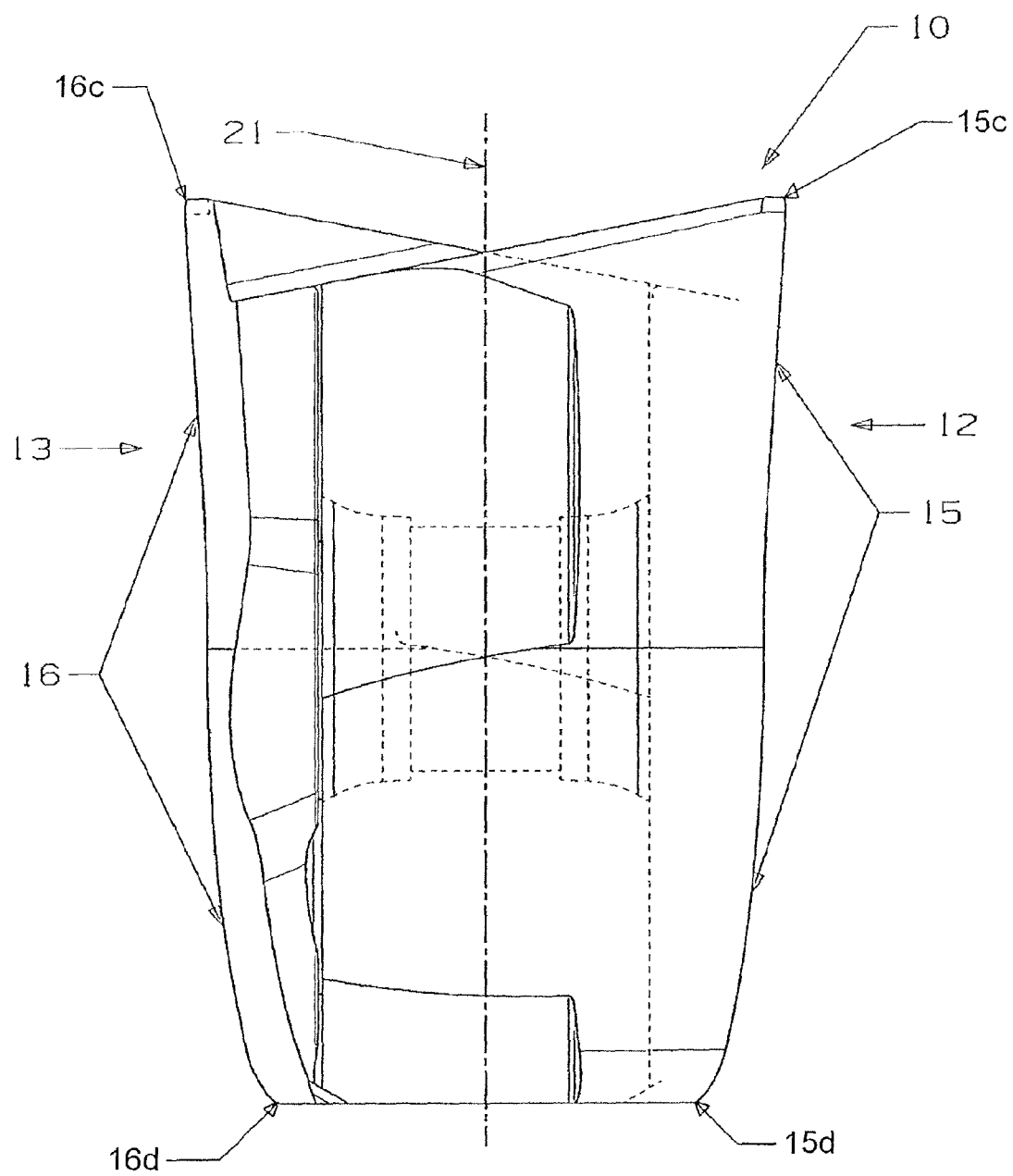
FIG. 4 is a side view of the cutting insert shown in FIGS. 1-3 (viewed from the left side of the cutting insert as shown in FIG. 3)

FIG. 4 is a side view of the cutting insert 10 shown in FIGS. 1-3 (viewed from the left side of the cutting insert as shown in FIG. 3). FIG. 4 illustrates the orientation of the sinusoidal and helical cutting edges 15 and 16 relative to the middle plane 21 between the top face 12 and the bottom face 13. The cutting edge 15 has a gradual downward gradient from a high point (relative to middle plane 21) at the nose corner 15c on the cutting edge portion 15a to a low point (relative to middle place 21) at the nose corner 15d on the cutting edge portion 15b. The gradual downward gradient of the cutting edge 15 comprises the combined geometric shape of a sinusoidal curve component and a true helical curve component. Likewise, the cutting edge 16 has a gradual downward gradient from a high point (relative to middle plane 21) at the nose corner 16c on the cutting edge portion 16a to a low point (relative to middle plane 21) at the nose corner 16d on the cutting edge portion 16b. The gradual downward gradient of the cutting edge 16 comprises the combined geometric shape of a sinusoidal curve component and a true helical curve component.

FIG. 5(a) is a schematic end view and FIG. 5(b) is a schematic top view of a cutting insert 50 illustrating the sinusoidal and helical cutting edges 51 and 52 of the cutting insert. The cutting insert 50 shown in FIGS. 5(a) and 5(b) is generally the same as the cutting insert 10 shown in FIGS. 1-4 except that the cutting insert 50 does not have rounded nose corners, but instead cutting insert 50 has points 56 at the ends of the sinusoidal and helical cutting edges 51 and 52 of the cutting insert. The points 56 are shown for the purpose of illustrating the geometry of the sinusoidal and helical cutting edge 51 (on the top face 53) and the sinusoidal and helical cutting edge 52 (on the bottom face 54). The sinusoidal and helical cutting edge 51, for example, is conceptually produced by trimming a sinusoidal cutting edge to have a contour that coincides with a helical surface 55.

The helical surface 55 is geometrically defined to be coincident with a true helix, as defined above, having a longitudinal axis 57. The longitudinal axis 57 of the helical surface 55 forms a helix angle Ha with the center plane 60 of the cutting insert 50. The helix angle Ha is the same angle as the constant helix angle formed between a tangent line at any point along the helix curve (defining the helix surface 55) and the central longitudinal axis of the helix curve.

FIG. 6(a) is a top view schematic diagram, and FIGS. 6(b) and 6(c) are perspective view schematic diagrams, illustrating the geometric positioning of the cutting insert 50 relative to a Cartesian coordinate system (XYZ), with the cutting insert positioned as if it were secured on a rotary tool holder (not shown). FIG. 6(b) is a perspective end view of the insert 50 as oriented in FIG. 6(a) (i.e., as viewed along the Y-coordinate direction as shown in FIG. 6(a)). FIG. 6(c) is a perspective side view of the insert 50 as oriented in FIG. 6(a) (i.e., as viewed along the X-coordinate direction as shown in FIG. 6(a)).

The cutting insert 50 in FIG. 6(a) is shown in an orientation rotated about the origin O of the XOY plane of the XYZ coordinate system. The angle of rotation of the insert 50 is equal to the helix angle Ha of the helical surface 55, which defines the helical geometric component of the sinusoidal and helical cutting edge 51. In this manner, the cutting insert 50 is shown in an orientation as if the cutting insert were positioned on a tool holder (not shown) having a cutting axis that is co-linear with the Y-axis of the XYZ coordinate system (see FIG. 21(a)).

The helical surface 55 is also rotated together with the cutting insert by the helix angle Ha (that is, the angle between the center plane 60 of the cutting insert 50 and the Y-axis of the XYZ coordinate system). In this manner, the angle formed between the center plane 60 of the cutting insert 50 and the longitudinal axis of the helix curve defining the helical surface 50 (i.e., the helical geometric component of the sinusoidal and helical cutting edge 50) is set equal to the helix angle Ha of the helix curve. As a result, the helical surface 55 is positioned coincident with a conceptual cylindrical surface having a central longitudinal axis co-linear with the cutting axis of a tool holder (not shown) and having a cylindrical radius equal to the cutting radius R1 of a cutting tool system comprising a tool holder and the cutting insert 50. FIGS. 6(b) and 6(c) show the positioning of the cutting insert 50 in the XOZ plane and the YOZ plane of the XYZ coordinate system, respectively, wherein the cutting edge 51 is located within the helical surface 55 having a helix radius of R1.

Figure 21A:
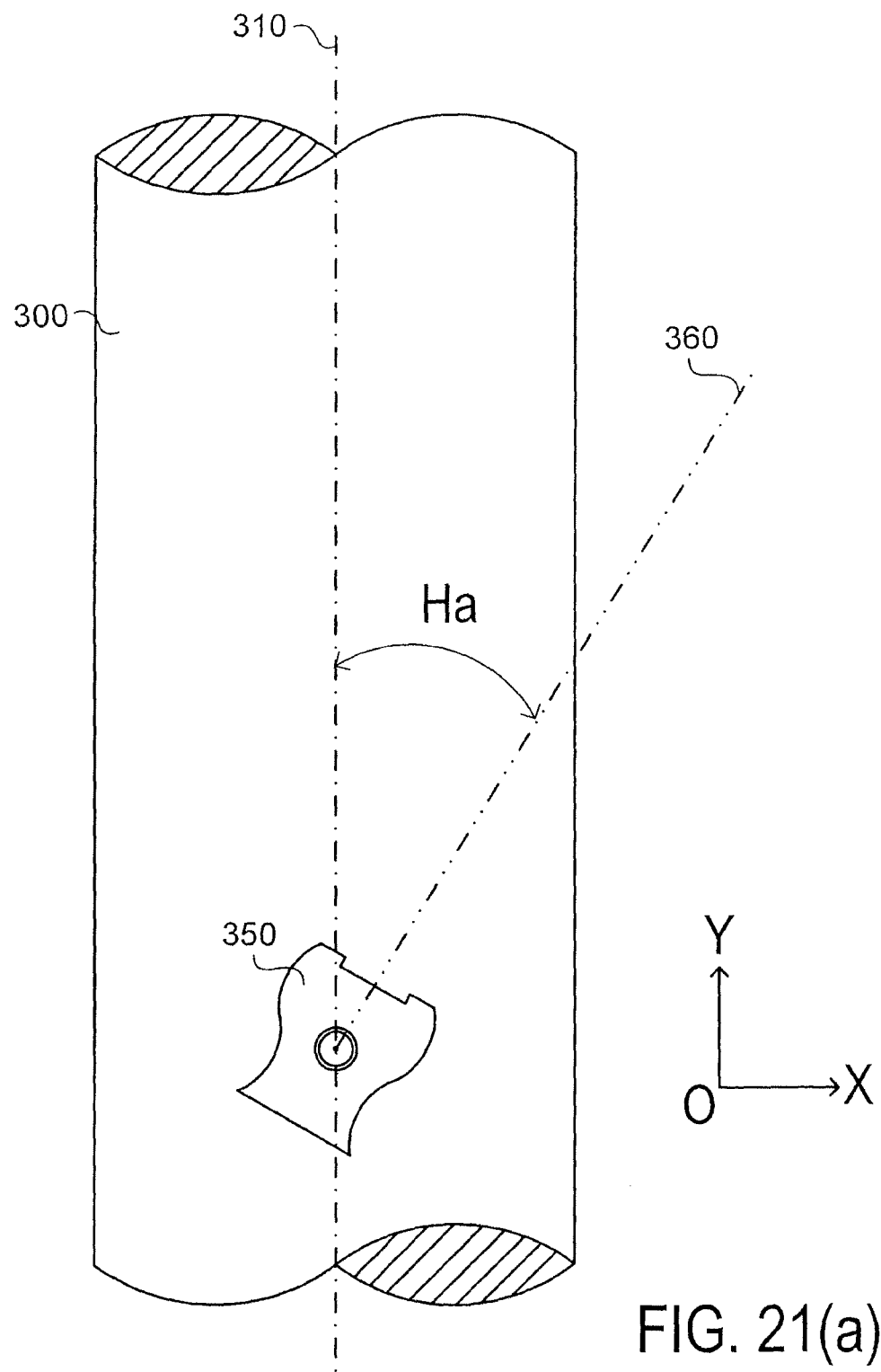
FIG. 21(a) is a schematic diagram illustrating the positioning of a cutting insert comprising two indexable, sinusoidal, and helical cutting edges relative to a tool holder and a coordinate system.

The formation of the sinusoidal and helical cutting edge 51 from P1 to P2 is, therefore, directly associated with the geometric relationship between the cutting insert 50 and a tool holder (not shown). This is further illustrated in FIGS. 21(a) and 21(b). FIG. 21(a) is a schematic diagram illustrating the positioning of a cutting insert 350 (comprising two indexable, sinusoidal, and helical cutting edges) relative to a tool holder 300 and an XYZ coordinate system. The cutting insert 350 is generally identical to the cutting insert 50 shown in FIGS. 5 and 6. The tool holder 300 has a central longitudinal cutting axis 310. The cutting insert 350 is positioned on the tool holder 300 so that the center plane 360 of the cutting insert 350 forms an angle with the axis 310 that is equal to the helix angle Ha of the helical component of the sinusoidal and helical cutting edges of the cutting insert.

Figure 21B:
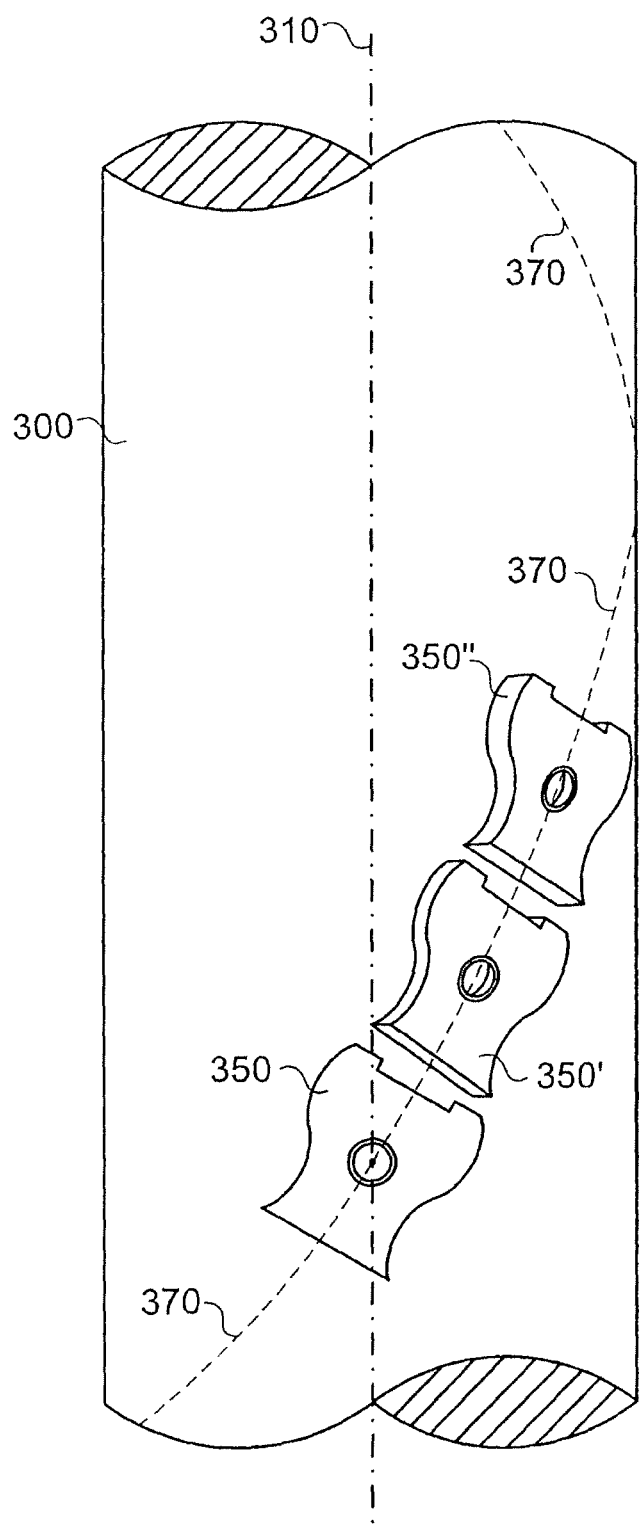
FIG. 21(b) is a schematic diagram illustrating the positioning of a series of common cutting inserts comprising two indexable, sinusoidal, and helical cutting edges relative to a tool holder and a coordinate system, in which the series of common cutting inserts form a cutting flute comprising the cutting inserts and having a cutting edge comprising a sinusoidal and helical geometric shape.

FIG. 21(b) is a schematic diagram illustrating the positioning of a series of common cutting inserts 350, 350', and 350", each cutting insert comprising two indexable, sinusoidal, and helical cutting edges, relative to the tool holder 300 and the XYZ coordinate system. As used herein, the term "common cutting inserts" and the like means inserts having the same geometric configuration and dimensions to within generally acceptable tolerances in the cutting tool industry. For instance, in various non-limiting embodiments, the common cutting inserts described in this specification may comprise a series (i.e., a plurality) of cutting inserts comprising the same material of construction and having the same shape, cutting features, and dimensions to within generally acceptable tolerances in the cutting tool industry.

Figure 5:
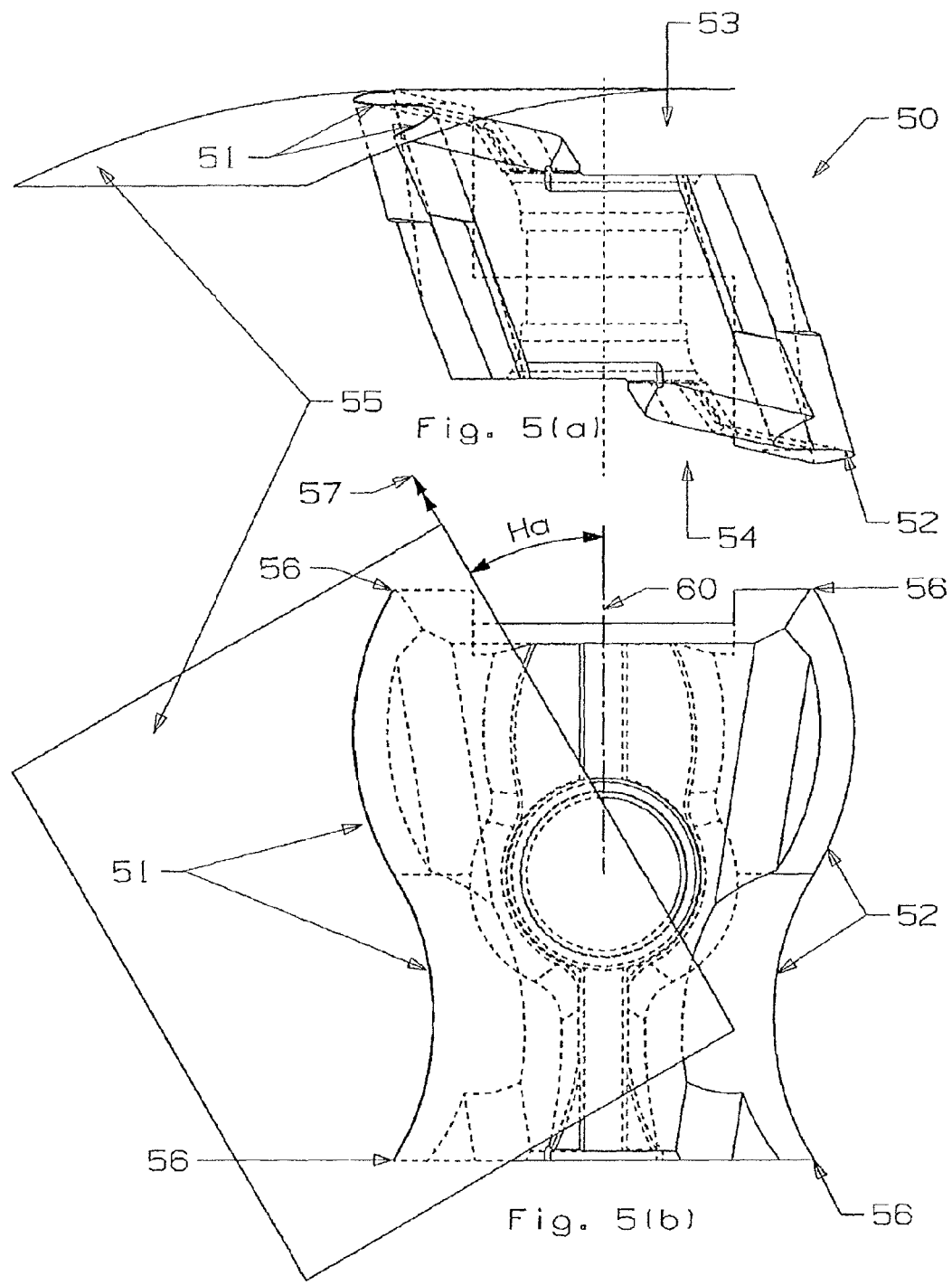
FIG. 5 shows schematic diagrams of the cutting insert shown in FIGS. 1-4 illustrating the sinusoidal and helical cutting edges of the cutting insert, in which FIG. 5(*a*) is a schematic end view and FIG. 5(*b*) is a schematic top view.
Figure 6:
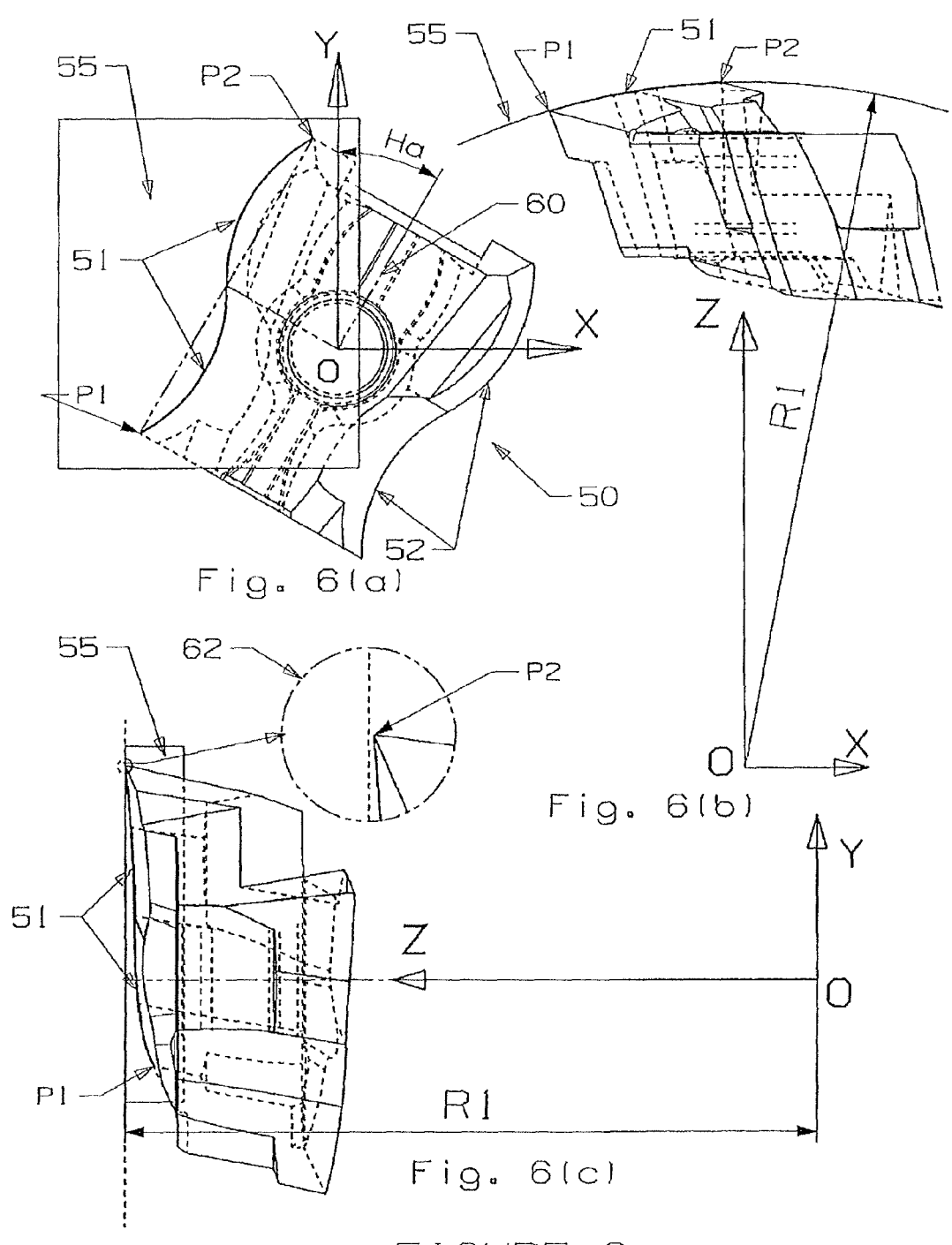
FIG. 6 shows schematic diagrams of the cutting insert shown in FIGS. 1-5 illustrating the geometric positioning of the cutting insert relative to a coordinate system, positioned as if the cutting insert were secured on a rotary tool holder (not shown), in which FIG. 6(*a*) is a top view schematic diagram and FIGS. 6(*b*) and 6(*c*) are perspective view schematic diagrams.

The common cutting inserts 350, 350', and 350" are generally identical to the cutting insert 50 shown in FIGS. 5 and 6, and together the series of common cutting inserts form a cutting flute comprising the cutting inserts. The cutting flute comprises a cutting edge having a sinusoidal and helical geometric shape in which the sinusoidal and helical cutting edge of the cutting flute is formed by the helical alignment of the individual sinusoidal and helical cutting edges of the cutting inserts on the tool holder. The center planes of the cutting inserts 350, 350', and 350" each form an angle Ha with the central longitudinal cutting axis 310 of the tool holder 300. The angle Ha formed between the center planes of the cutting inserts 350, 350', and 350" and the central longitudinal cutting axis 310 of the tool holder 300 is equal to the helix angle of the helix 370. The helix 370 defines the helical geometric component of the sinusoidal and helical cutting edges of the cutting inserts and the combined sinusoidal and helical cutting edge of the cutting flute formed by the aligned cutting inserts.

Referring to FIG. 6, by geometrically defining the positioning of the cutting insert 50 relative to an XYZ coordinate system, positioned as if the cutting insert were mounted on a tool holder, a design method for producing a cutting insert comprising at least one indexable, sinusoidal, and helical cutting edge may be used to create a mathematical design model. The mathematical design model may be used to manufacture cutting inserts having sinusoidal and helical cutting edges that together form a cutting flute comprising a sinusoidal and helical cutting edge. The mathematical design model defines a cutting edge having a three-dimensional complex geometry comprising a combined sinusoidal curve component and helical curve component. In accordance with the mathematical model, every point along a sinusoidal and helical cutting edge (e.g., cutting edges 51 and 52 in FIG. 6) is located precisely on a conceptual cylindrical surface (e.g., surface 55 in FIG. 6) defined by the cutting radius of a cutting tool system comprising a tool holder (not shown in FIG. 6) and a plurality of common cutting inserts (e.g., insert 50 in FIG. 6).

Figure 7:
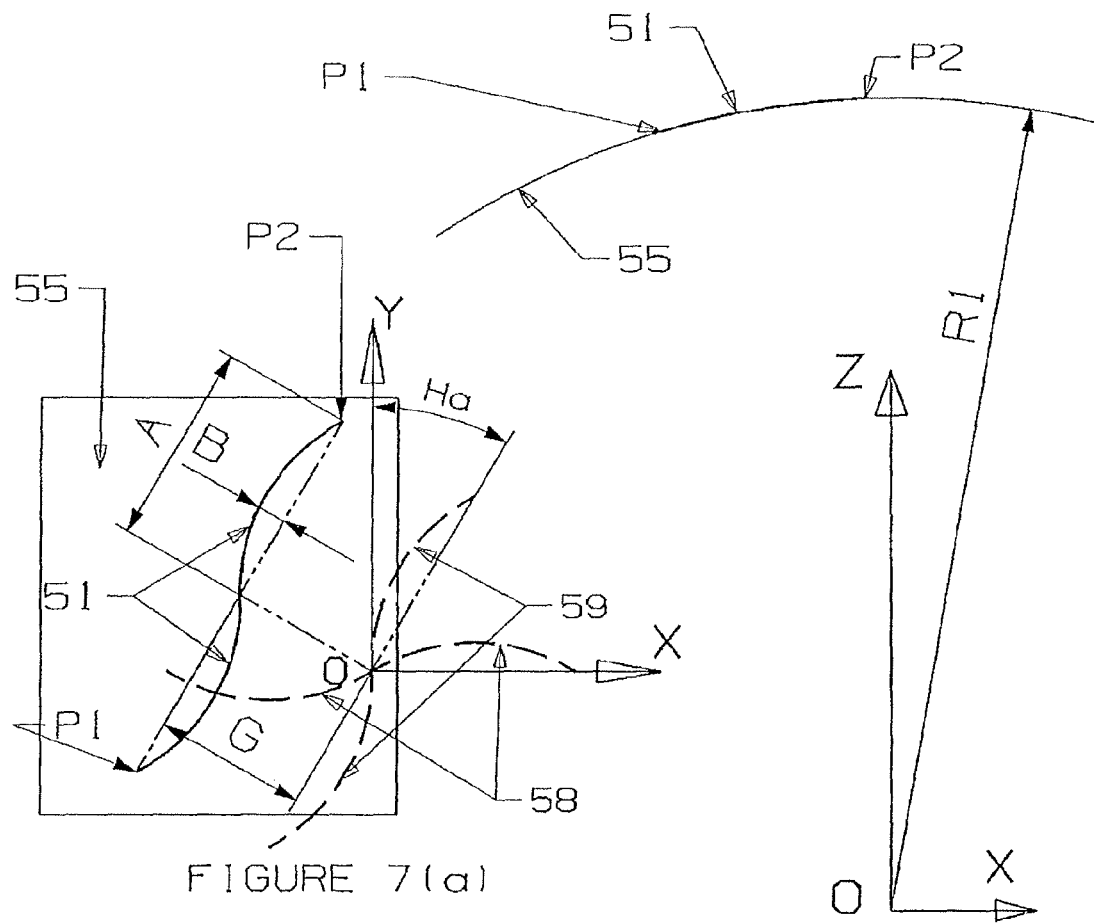
FIG. 7 shows schematic diagrams illustrating curves derived to establish a mathematical design model for the sinusoidal and helical cutting edges of the insert shown in FIGS. 1-6, in which the curves shown in FIGS. 7(*a*), 7(*b*), and 7(*c*) correspond to the cutting insert positioning shown in FIGS. 6(*a*), 6(*b*), and 6(*c*), respectively.
Figure 7:
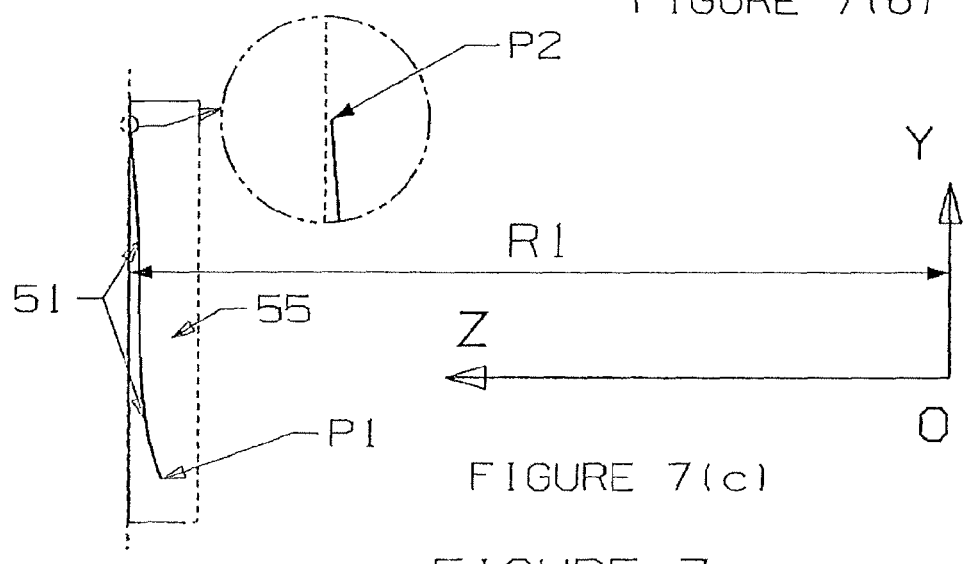

FIGS. 7(*a*), 7(*b*), and 7(*c*) are schematic diagrams illustrating curves derived to establish a mathematical design model for the sinusoidal and helical cutting edges of the insert shown in FIGS. 1-6, in which the curves shown in FIGS. 7(*a*), 7(*b*), and 7(*c*) correspond to the cutting insert positioning shown in FIGS. 6(*a*), 6(*b*), and 6(*c*), respectively. In order to establish an equation for the sinusoidal and helical cutting edge 51, two dashed-line sinusoidal curves 58 and 59 are introduced, as shown in FIG. 7(*a*). The two dashed-line curves 58 and 59 both have the same geometric shape and dimensions as the cutting edge 51, but have different orientations relative to the XYZ coordinate system. The sinusoidal curve 58 has a mean line that is co-linear with the X-axis of the XYZ coordinate system. The sinusoidal curve 59 is parallel to the cutting edge 51 and centered on the origin O of the XYZ coordinate system. The cutting edge 51 may be regarded as a geometric transformation of the curves 58 and 59, as shown in FIG. 7(*a*).

A mathematical equation may be established as follows for the curve 58 according to the XOY plane of the XYZ coordinate system in FIG. 7(*a*), where the Y-axis is co-linear with the cutting axis of a cutting tool:

$$Y = B \cdot \sin\left(\frac{\pi}{A}\right) \cdot X \quad (1)$$

wherein the parameters B and A are defined in FIG. 7(*a*) as the amplitude and half-wavelength of the sinusoidal component of the cutting edge 51. Equation (1) may be expressed in a general form as follows:

$$f_{58}(X,Y)=0 \quad (2)$$

Equation (2) generally defines the curve 58 as a function of the X and Y parameters of the XYZ coordinate system.

By introducing a rotation transformation (Ro), the following equation for the curve 59 can be established from the rotation of the curve 58 about the origin O in the XOY plane of the XYZ coordinate system:

$$f_{59}(X,Y) = \quad (3)$$

$$f_{58}(X,Y)\cdot Ro = f_{58}(X,Y)\cdot \begin{bmatrix} \cos(90°-Ha) & -\sin(90°-Ha) & 0 \\ \sin(90°-Ha) & \cos(90°-Ha) & 0 \\ 0 & 0 & 1 \end{bmatrix}$$

wherein Ha is the helix angle as shown in FIG. 6(*a*), FIG. 7(*a*), and FIG. 21(*a*).

By introducing a translation transformation (Txy), the following equation for the cutting edge 51 can be established from the translation of the curve 59 within the XOY plane:

$$f_{51}(X,Y) = \quad (4)$$

$$f_{59}(X,Y)\cdot Txy = f_{59}(X,Y)\cdot \begin{bmatrix} 1 & 0 & 0 \\ 0 & 1 & 0 \\ -G\cdot\cos(Ha) & G\cdot\sin(Ha) & 1 \end{bmatrix}$$

wherein G is defined in FIG. 7(*a*) as the perpendicular distance between the mean line of the cutting edge 51 and the mean line of the curve 59. Ha is the helix angle as described above.

As shown in FIG. 7(*b*), in the XOZ plane of the XYZ coordinate system, the cylindrical surface 55 is defined by the cutting radius R1 and the entire cutting edge is precisely located on the cylindrical surface 55. As discussed above, the cylindrical helix surface 55 shown in FIGS. 6 and 7 is the same as the helical surface 55 shown in FIG. 5, but rotated with the cutting insert 50 by a helix angle Ha (relative to the XYZ coordinate system) so that the helical surface 55 becomes a cylindrical surface 55 geometrically related to the cutting radius R1 of a cutting tool comprising a tool holder and at least one cutting insert 50 comprising a sinusoidal and helical cutting edge 51. Therefore, the equation of the cylindrical surface 55 in the XOZ plane, as shown in FIG. 7(*b*), may be expressed as:

$$X^2 + Z^2 = R1^2 \quad (5)$$

and in a general form as, $$f_{55}(X,Z)=0 \quad (6)$$

wherein R1 is the radius of the circular cross-section of the cylindrical surface 55 in the XOZ plane, which is equal to the cutting radius of a cutting tool with a cutting axis centered at the origin O and perpendicular to XOZ plane of the XYZ coordinate system.

Referring to FIG. 7(*b*), where the cutting axis is represented by the Y-axis (perpendicular to the plane of the page), and is centered at the origin O, every point on the cutting edge 51 from P1 to P2 is located at the cylindrical surface 55 defined by Equation (5). As noted above, every point on the cutting edge 51 from P1 to P2 is also located on the sinusoidal curve defined by Equation (4). By extending the sinusoidal curve defined by Equation (4) (i.e., the sinusoidal component of the cutting edge 51) in the direction of +/−Z axis to become a three-dimensional sinusoidal surface perpendicular to the XOY plane, and by simultaneously extending the circular cross-section defined by Equation (6) (i.e., the helical component of the cutting edge 51) in the direction of +/−Y axis to become a three-dimensional cylindrical surface perpendicular to the XOZ plane, two three-dimensional equations can be obtained.

$$f_{51}(X,Y,Z)=0 \qquad (7)$$

$$f_{55}(X,Y,Z)=0 \qquad (8)$$

An equation that mathematically defines the three-dimensional combined sinusoidal and helical cutting edge 51, as shown in FIG. 6(c) and FIG. 7(c) from P1 to P2, is obtained by solving Equations (7) and (8) simultaneously to obtain the equation of a three-dimensional curve defining the intersection of the two above-described three-dimensional surfaces (i.e., the three-dimensional sinusoidal surface perpendicular to the XOY plane and the three-dimensional cylindrical surface perpendicular to the XOZ plane):

$$f_{51}^{3D\text{-}C}(X, Y, Z) = \begin{cases} f_{51}(X, Y, Z) = 0 \\ f_{55}(X, Y, Z) = 0 \end{cases} \qquad (9)$$

where the superscript 3D-C indicates a three-dimensional curve.

The mathematical design method and resulting design models described in connection with FIGS. 5-7 and Equations (1)-(9) may be used to design and fabricate cutting inserts having sinusoidal and helical cutting edges. The mathematical design model defines a cutting edge having a three-dimensional complex geometry comprising a combined sinusoidal curve component and helical curve component. The method may be summarized as follows.

First, conceptually positioning the cutting insert as if it were on a tool holder and forming a helix angle relative to the longitudinal axis of the tool holder. Second, conceptually rotating the original helical surface (e.g., surface 55 in FIG. 5) by the same helix angle. Third, establishing a three-dimensional XYZ coordinate system with the Y-axis co-linear with the cutting axis of a cutting tool system defined by a cutting radius that is centered at the cutting axis (e.g., radius R1 in FIGS. 6 and 7). Fourth, deriving equations that define the sinusoidal and helical components of the cutting edge relative to the coordinate system. In this manner, a helical surface (e.g., surface 55 in FIG. 5) is converted into a cylindrical surface (e.g., surface 55 in FIGS. 6 and 7) that represents the cutting path defined by the cutting radius of the cutting tool system, and the sinusoidal surface intersected by the cylindrical surface mathematically defines a combined sinusoidal and helical cutting edge.

The various embodiments disclosed and described in this specification also provide a design method for positioning multiple cutting inserts on a tool holder to form a cutting flute comprising a combined sinusoidal and helical cutting edge in a cutting tool system. This design method creates a design model that may be used to machine the insert pockets in a helical orientation on a tool holder so that indexable cutting inserts may be assembled together and aligned to form a cutting flute comprising a sinusoidal and helical cutting edge. This design method is also based on the XYZ coordinate system established in connection with FIGS. 6-7, and may be used to specify the assembly of multiple cutting inserts on the tool holder such that each cutting insert forms a portion of a sinusoidal and helical cutting edge about the longitudinal cutting axis.

Figures 8, 8A, 8B:
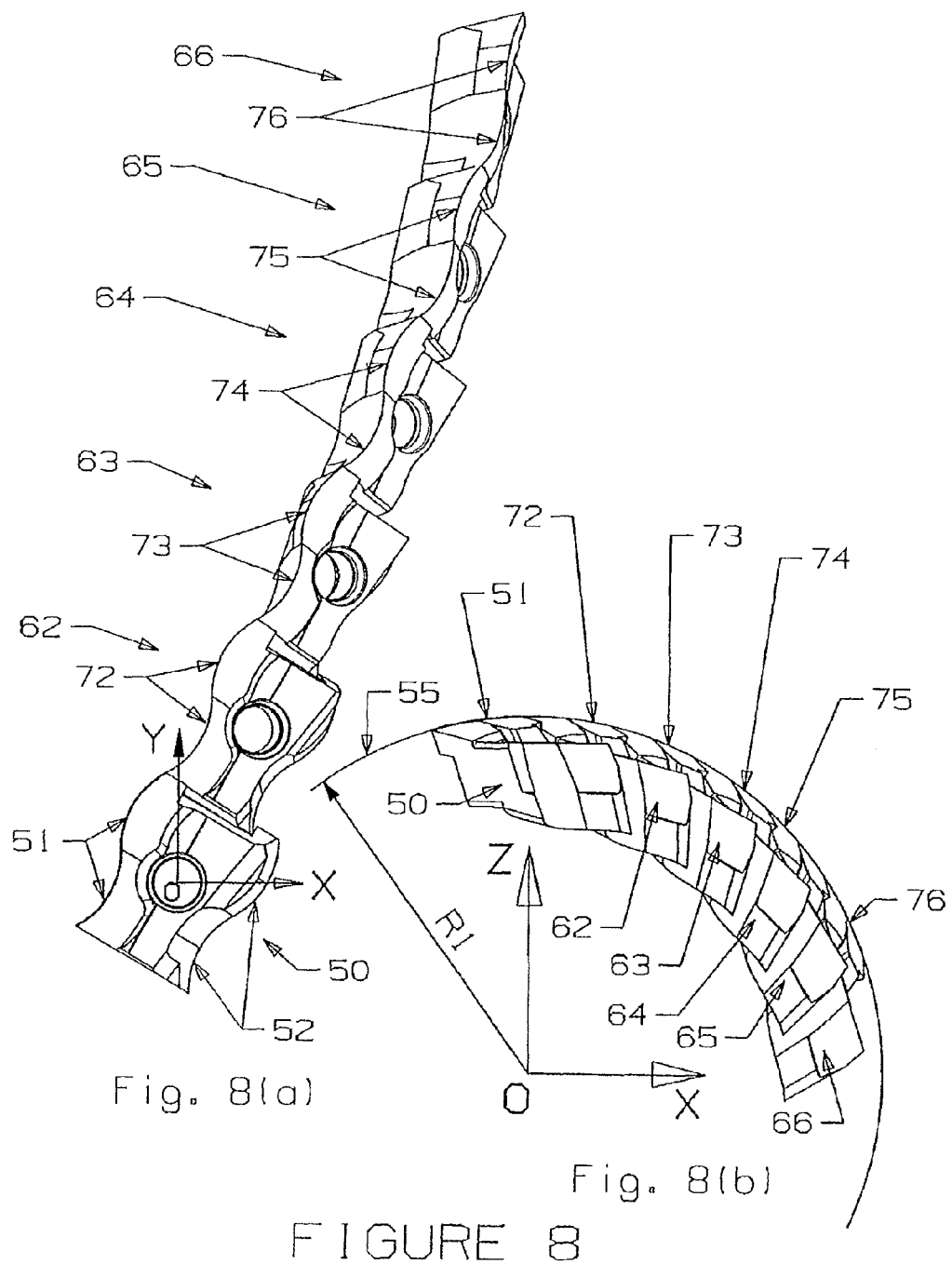
FIG. 8 shows schematic diagrams illustrating the relative positioning of a series of common cutting inserts (as shown in FIGS. 1-6), positioned as if the cutting inserts were assembled and secured to a rotary tool holder (not shown) to form a cutting flute comprising the series of cutting inserts and having a cutting edge comprising a sinusoidal and helical geometric shape, in which FIG. 8(*a*) is a side view schematic diagram of the cutting flute and FIG. 8(*b*) is an end view schematic diagram of the cutting flute.

FIGS. 8(a) and 8(b) are schematic diagrams illustrating the relative positioning of a series of common cutting inserts 50 and 62-66, positioned as if the cutting inserts were assembled and secured to a rotary tool holder (not shown), and helically aligned to form a cutting flute comprising the series of cutting inserts and having a cutting edge comprising a sinusoidal and helical geometric shape. FIG. 8(a) is a schematic view from a direction perpendicular to the XOY plane of the XYZ coordinate system and FIG. 8(b) is a schematic view from a direction perpendicular to the XOZ plane of the XYZ coordinate system. In FIGS. 8(a) and 8(b) the Y-axis is co-linear with the longitudinal cutting axis of the cutting tool system.

As shown in FIG. 8(b), the cylindrical surface 55 is defined by the cutting radius R1 located at the origin O. The cutting axis (i.e., the Y-axis) is centered at the origin O and is perpendicular to the XOZ plane. A first cutting insert 50 having two indexable sinusoidal and helical cutting edges 51 and 52 is positioned in accordance with the design method described above. A series of common cutting inserts 62-66, which are geometrically and dimensionally the same as the cutting insert 50, are positioned in helical alignment to form a cutting flute. The sinusoidal and helical cutting edges of each insert comprising the cutting flute are in helical alignment and form a combined sinusoidal and helical cutting edge on the cutting flute.

In order to position the cutting inserts 62-66 to form a cutting flute comprising a combined sinusoidal and helical cutting edge, the cutting inserts may be positioned by: (1) rotating about the cutting axis (i.e., the Y-axis) while maintaining the constant cutting radius R1; and (2) translating parallel to the cutting axis while maintaining the constant cutting radius R1. Any other positional changes for any of the multiple common cutting inserts 62-66 will cause the cutting inserts to be misaligned and the cutting edges of the cutting inserts will not lie on the cylindrical surface 55. Misalignment will create dimensional errors in the actual cutting path of the cutting tool system (i.e., the cutting path will not be accurately and precisely defined by the cutting radius R1). Misalignment will also alter the overall sinusoidal shape of the cutting edge and invalidate the overall helical shape of the cutting flute, notwithstanding that each individual cutting insert has a sinusoidal and helical cutting edge.

Geometrically, the position of each cutting insert 62-66 is initially set at the same position as the cutting insert 50 relative to the XYZ coordinate system, in which the cutting edge 51 is defined by Equation (9). The position of the cutting inserts 62-66 is then mathematically adjusted to an alignment position by rotating each insert about the cutting axis (i.e., the Y-axis) and translating each insert parallel to the cutting axis while maintaining the constant cutting radius. For example, considering the cutting insert 62, which is positioned immediately adjacent to the cutting insert 50 and has a cutting edge 72 aligned with the cutting edge 51 of cutting insert 50, a first movement in the XYZ coordinate system is a three-dimensional rotation transformation about the cutting axis (i.e., the Y-axis), and a second movement is a linear translation transformation parallel to the cutting axis. The translations from the position of cutting insert 50 to define the position of cutting insert 72 are derived from Equation (9), defining the position of cutting insert 50, as follows:

$$f_{72}^{3D\text{-}C}(X,Y,Z) = f_{51}^{3D\text{-}C}(X,Y,Z) \cdot Ry(Q) \cdot Txyz(J,K,L) \qquad (10)$$

wherein Ry represents a three-dimensional rotation matrix about the Y-axis and Txyz represents a three-dimensional translation matrix parallel to the Y-axis, and the superscript 3D-C indicates a three-dimensional curve.

The rotation matrix and the translation matrix are defined as follows:

$$Ry(Q) = \begin{bmatrix} \cos(Q) & 0 & \sin(Q) & 0 \\ 0 & 1 & 0 & 0 \\ -\sin(Q) & 0 & \cos(Q) & 0 \\ 0 & 0 & 0 & 1 \end{bmatrix} \quad (11)$$

$$Txyz(J, K, L) = \begin{bmatrix} 1 & 0 & 0 & 0 \\ 0 & 1 & 0 & 0 \\ 0 & 0 & 1 & 0 \\ J & K & L & 1 \end{bmatrix} \quad (12)$$

wherein Q is the angle of rotation about the Y-axis, and J, K, and L are the distances moved in each X, Y and Z direction, respectively. In order to limit the linear movement of the translation transformation to movement that is parallel to the Y-axis, J and L are set to zero.

The remaining cutting inserts 63-66 forming the cutting flute are the same as the cutting insert 62. Therefore, a general equation for multiple common cutting inserts, such as, for example, cutting inserts 62 to 66, may be expressed as indicated in Equation (13) below, assuming the engaging cutting edge (i.e., the cutting edge in cutting action) of the first common cutting insert $[f_1^{3D-C}(X,Y,Z)]$ is defined and positioned in accordance with Equations (1) to (9) and the XYZ coordinate system established in FIGS. 6 to 8:

$$f_i^{3D-C}(X,Y,Z) = f_1^{3D-C}(X,Y,Z) \cdot Ry(i \cdot Q) \cdot Txyz(J, i \cdot K, L) \quad i = 2, \ldots, n \quad (13)$$

wherein i represents the engaging cutting edge for the ith common cutting insert among a total of n cutting inserts, and $f_i^{3D-C}(X,Y,Z)$ represents the position of the engaging cutting edge of the ith common cutting insert in the XYZ coordinate system.

In this manner, the position of each sinusoidal and helical cutting insert on a tool holder with a defined cutting diameter (or radius) is mathematically defined so that the overall cutting edge of the cutting flute formed from the assembly and alignment of the individual common cutting inserts is a combined sinusoidal and helical cutting edge, as shown in FIG. 8.

The mathematical design method and resulting design models described in connection with FIG. 8 and Equations (10)-(13) may be used to manufacture cutting tool holders having insert pockets configured to mechanically engage and secure a series of cutting inserts having sinusoidal and helical cutting edges so that the secured inserts are helically aligned to form a cutting flute on the tool holder and comprising a sinusoidal and helical cutting edge. The mathematical design model defines the positioning of the series of cutting inserts so that the cutting edge of the cutting flute has a three-dimensional complex geometry comprising a combined sinusoidal curve component and helical curve component.

The design methods and models described in this specification for defining and positioning multiple cutting inserts on a tool holder are fundamentally different than and distinct from prior design methods that depend on multiple discrete positional parameters such as, for example, cutting diameter (or radius), axial angle, radial angle, and the like. It is not possible to specify with mathematical accuracy and precision a complex three-dimensional sinusoidal and helical cutting edge comprising multiple cutting inserts using prior design methods.

In various non-limiting embodiments, a method for designing and/or producing a sinusoidal and helical cutting edge on a cutting insert comprises:

(a) positioning a cutting insert having a sinusoidal-shaped cutting edge as if it were on a tool holder with a helix angle; and (b) modifying the sinusoidal shape of the cutting edge of the cutting insert to coincide with a cylindrical surface defined by the cutting radius centered at the cutting axis of a cutting tool system.

In various non-limiting embodiments, a method for designing and/or producing an assembly of common cutting inserts forming a cutting flute comprising a sinusoidal and helical cutting edge (wherein each cutting insert comprises at least one sinusoidal and helical cutting edge) comprises:

(a) placing a first cutting insert at the position where its cutting edge is defined in accordance with the above-described method for designing the sinusoidal and helical cutting edge;

(b) rotating a second cutting insert (and each subsequent cutting insert thereafter) about the cutting axis of a cutting tool system; and (c) translating the second cutting insert (and each subsequent cutting insert thereafter) parallel to the cutting axis.

In various non-limiting embodiments, a method for designing multiple insert pockets to secure multiple common cutting inserts forming a cutting flute comprising a sinusoidal and helical cutting edge on a cutting tool holder of a cutting tool system comprises:

(a) positioning a seating surface of the first insert pocket according to the assembly position of the first common cutting insert having a sinusoidal-shaped cutting edge as if it were on a tool holder with a helix angle;

(b) rotating the seating surface of a second insert pocket (and each subsequent insert pocket thereafter) about the cutting axis of a cutting tool system; and (c) translating the seating surface of the second insert pocket (and each subsequent insert pocket thereafter) parallel to the cutting axis while maintaining a constant cutting radius as defined by the cutting tool system.

In various non-limiting embodiments, a cutting insert may be manufactured based on a design model developed using a method for defining the sinusoidal and helical cutting edge. In various non-limiting embodiments, a tool holder configured to engage, secure, and align multiple cutting inserts in multiple respective insert pockets may be manufactured based on the design model developed in the method for defining the positioning of cutting inserts forming a cutting flute comprising a sinusoidal and helical cutting edge (wherein each cutting insert comprises at least one sinusoidal and helical cutting edge). For example, cutting inserts comprising at least one sinusoidal and helical cutting edge may be fabricated using automated grinding techniques based on the design model described above in connection with Equations (1)-(9), and tool holders may be fabricated using computer numerical control (CNC) machining based on the assembly design model described above in connection with Equations (10)-(13).

The cutting inserts manufactured based on the first design method may be assembled on a tool holder manufactured based in the second design method to form a cutting tool system. In various non-limiting embodiments, the cutting tool system may comprise a tool holder comprising a plurality of common insert pockets positioned in a helical orientation about a longitudinal axis of the tool holder. As used herein, the term "common insert pockets" and the like means a common cutting insert can be secured into any common insert pocket even though some of the common insert pockets may be different in geometry. In particular, the common insert pocket adjacent to the insert pocket of an end-face cutting insert and the last common insert pocket at the proximal of a cutting flute (proximal relative to a shank portion of a cutting tool holder comprising the cutting flute) may have different geometry but nonetheless be common insert pockets because a common cutting insert is securable in the respective common insert pockets. The cutting tool system may also comprise a plurality of common cutting inserts removably attachable to the plurality of common insert pockets in the tool holder to form at least one cutting flute on the tool holder, the at least one cutting flute comprising a helical grouping of common cutting inserts positioned in the insert pockets. The common cutting inserts each comprise at least one sinusoidal and helical cutting edge. The at least one cutting flute comprises a sinusoidal and helical cutting edge positioned about the longitudinal axis of the tool holder and formed by alignment of the individual sinusoidal and helical cutting edges of the common cutting insert that comprise the at least one cutting flute.

In various rotary machining applications using cutting tools comprising multiple indexable cutting inserts, a special front end-face cutting insert may be advantageous. As used herein, the term "end-face cutting insert" refers to a cutting insert configured to be positioned at the front face end of a tool holder to axially engage a workpiece surface in a direction parallel to the longitudinal axis of the tool holder. In various non-limiting embodiments, an end-face cutting insert engages a workpiece surface both axially and circumferentially, for example, if the end-face cutting insert is positioned at the periphery of a front end face of a tool holder. In various non-limiting embodiments, a cutting tool system comprises an end-face cutting insert configured to at least axially engage a workpiece during machining operations when assembled on a tool holder.

Figure 9:
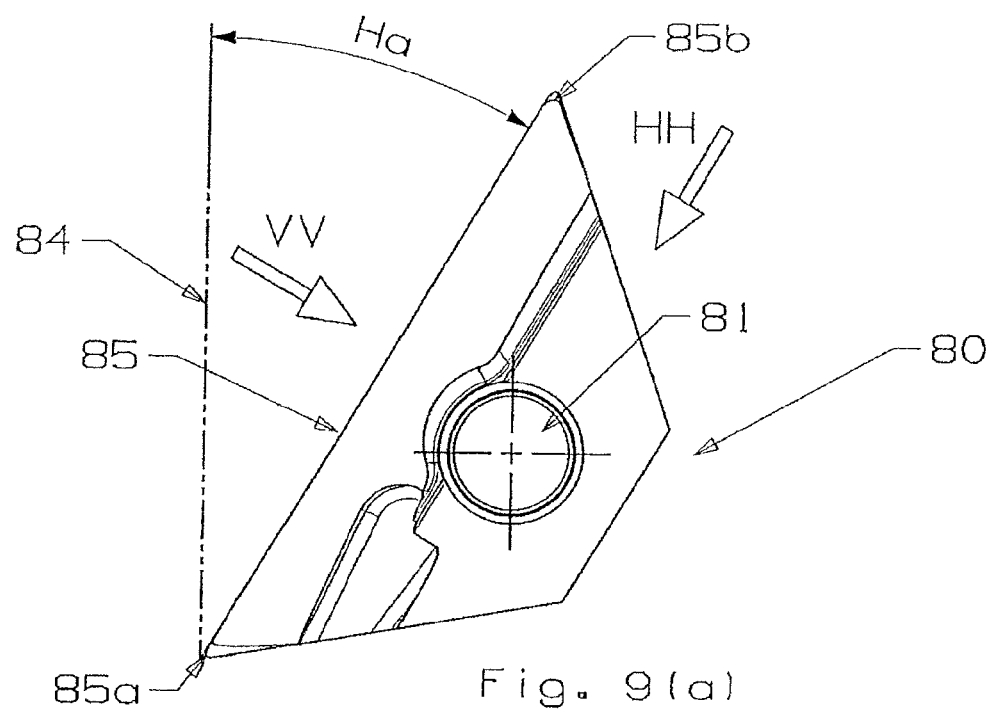
Figure 9:
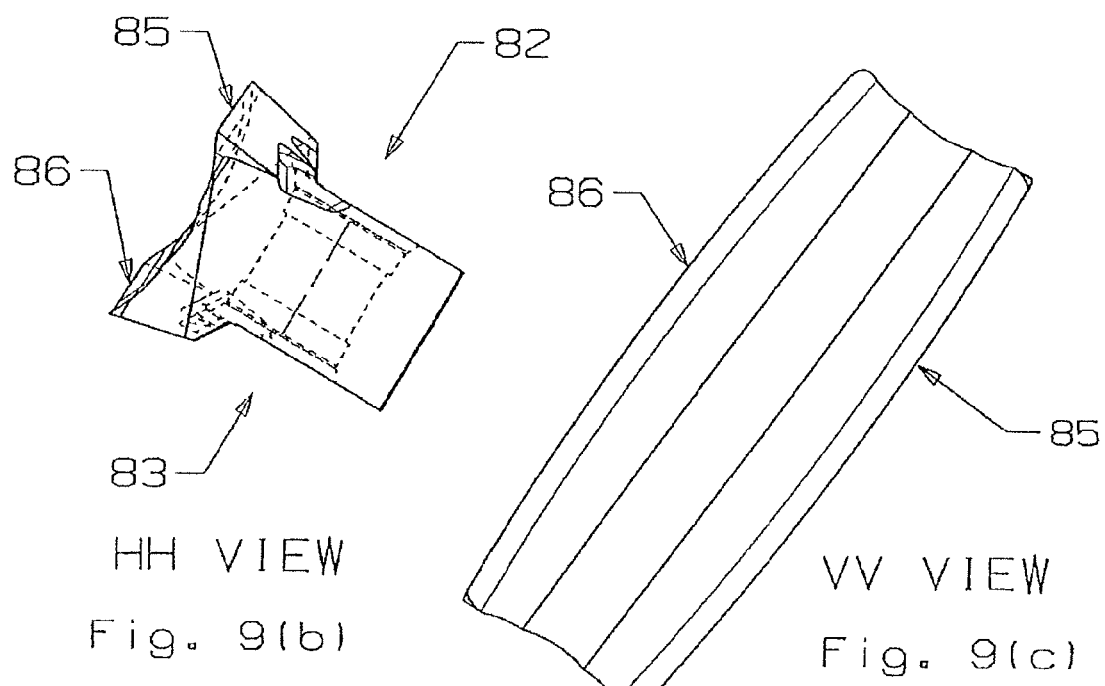

FIGS. 9(a)-9(c) show an end-face cutting insert 80 having two indexable cutting edges (85 and 86). The end-face cutting insert 80 is configured to be used as a different end-face cutting insert in combination with the common cutting inserts shown in FIG. 8 in a cutting tool system comprising sinusoidal and helical cutting edges.

As shown in FIG. 9(a), the end-face cutting insert 80 comprises a center through-hole 81 (configured to secure the cutting insert to a tool holder) and two identical cutting edges 85 and 86. The cutting edges 85 and 86 are located on the top side 82 and the bottom side 83, respectively. The cutting edges 85 and 86 are helical-shaped cutting edges. The two ends of the cutting edge 85 are rounded with nose corners 85a and 85b. The two ends of the cutting edge 86 are also rounded with nose corners. The end-face cutting insert 80 is positioned with cutting edge 85 forming an angle with a cutting axis 84 equal to the helix angle Ha of the helix curve defining the helical shape of the cutting edge 85.

Figures 10, 10A, 10B:
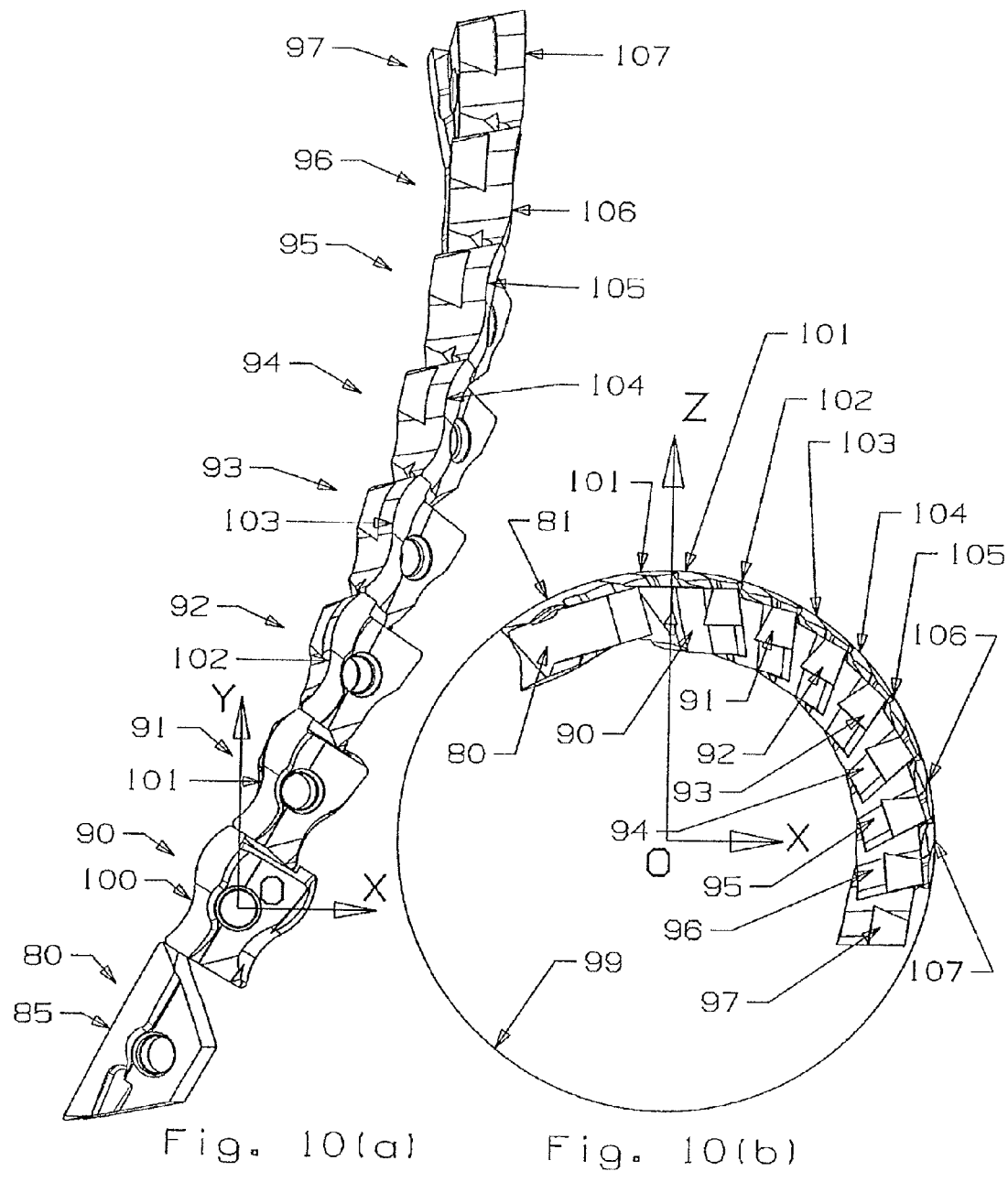

FIGS. 10(a) and 10(b) are schematic diagrams illustrating the relative positioning of a series of common cutting inserts 90-97 and an end-face cutting insert 80, positioned as if the cutting inserts were assembled and secured to a rotary tool holder (not shown) to form a cutting flute comprising the series of cutting inserts and comprising a sinusoidal and helical cutting edge. The engaging cutting edge 100 of the common cutting insert 90 is defined and positioned in accordance with Equation (9), and the engaging cutting edges 101-107 of the common cutting inserts 91-97, respectively, are positioned in accordance with Equation (13).

The end-face cutting insert 80 is positioned in accordance with Equation (13) with i=2, but using a different rotating angle Q and a different translating distance value K because the cutting edge 85 of the end-face cutting insert 80 is different than the cutting edges 100-107 of the common cutting inserts 90-97. The cutting edges 100-107 of the common cutting inserts 90-97 form a combined sinusoidal and helical cutting edge in the direction of and about the longitudinal axis of the tool holder (not shown) (i.e., the Y axis). As shown in FIG. 10(b), all of the cutting edges 100-107 of the common cutting inserts 90-97, and the cutting edge 85 of the end-face cutting insert 80, are precisely and accurately located on the cylindrical surface 99 representing the cutting diameter/radius of a rotary cutting tool system.

FIGS. 11(a) and 11(b) are schematic diagrams illustrating the relative positioning of a series of different-sized end-face cutting inserts 80, 111, 112, 113, and 114, positioned as if the end-face cutting inserts where assembled and secured to a rotary tool holder (not shown) configured to comprise five cutting flutes. In order to offset any gap between two adjacent cutting inserts in a cutting flute comprising the cutting inserts (e.g., gaps between adjacent common cutting inserts or gaps between an end-face cutting insert and an adjacent common cutting insert), it may be advantageous to make multiple end-face cutting inserts, each end-face cutting insert having a different length on the cutting edge. For example, as shown in FIG. 11(a), the multiple end-face cutting inserts 80 and 111-114 each have a different length L1-L5, respectively.

As shown in FIG. 11(b), each end-face cutting insert has at least one, and in various non-limiting embodiments, two indexable cutting edges, that is, cutting edges 85 and 86 of the end-face cutting insert 80, cutting edges 121 and 122 of the end-face cutting insert 111, cutting edges 123 and 124 of the end-face cutting insert 112, cutting edges 125 and 126 of the end-face cutting insert 113, and cutting edges 127 and 128 of the end-face cutting insert 114. All of the workpiece-engaging cutting edges (i.e., cutting edges 85, 121, 123, 125, and 127 of the cutting inserts 80 and 111-114, respectively) are located on the cylindrical surface 118 representing the cutting diameter/radius of a rotary cutting tool system.

FIGS. 12(a) and 12(b) are schematic diagrams illustrating the relative positioning of five (5) cutting flutes, each flute comprising a different-sized end-face cutting insert (80, 111-114), and a series of common cutting inserts, positioned as if the cutting inserts were assembled and secured to a rotary tool holder (not shown). The five (5) cutting flutes each comprise a sinusoidal and helical cutting edge formed by the assembly and alignment of the sinusoidal and helical cutting edges of the common cutting inserts. The end-face cutting inserts (e.g., insert 80) are positioned and helically aligned with adjacent common cutting inserts (e.g., insert 90).

The position of each cutting insert is defined in accordance with Equation (13), wherein each end-face cutting insert (80, 111-114) may have a set of different values for the Q and K parameters. All engaging cutting edges, including the helical cutting edges of the end-face cutting inserts 80 and 111-114, are located on the cylindrical surface 138 representing the cutting diameter/radius of a rotary cutting tool system. In various non-limiting embodiments, it may be advantageous to overlap the cutting edges in the direction of the longitudinal cutting axis between the inserts comprising adjacent cutting flutes. Overlapping cutting edges may improve cutting accuracy and precision because trailing cutting flutes will remove uncut material left by the cutting action performed by leading cutting flutes. In this manner, a plurality of cutting flutes, each flute comprising a helically aligned assembly of longitudinally offset common cutting inserts, results in a fully effective cutting flute.

The amount of residual material left by the cutting action of a leading cutting flute may be related to the degree of nose corner rounding of the cutting inserts of the cutting flute. In various non-limiting embodiments, sinusoidal and helical cutting inserts comprising rounded nose corners may form small gaps in the combined sinusoidal and helical cutting edge of the cutting flute comprising the cutting inserts. A trailing cutting flute comprising a helically aligned assembly of common cutting inserts that are longitudinally offset relative to the inserts that comprise a leading cutting flute will cut and/or remove any residual material because the rounded nose corners of the inserts comprising the trailing cutting flute are longitudinally off-set relative to the nose corners of the inserts comprising the leading cutting flute. In other words, the junctions between the constituent cutting inserts of the cutting flutes are not aligned in a plane perpendicular to the longitudinal cutting axis of a rotary cutting tool.

Figure 11:
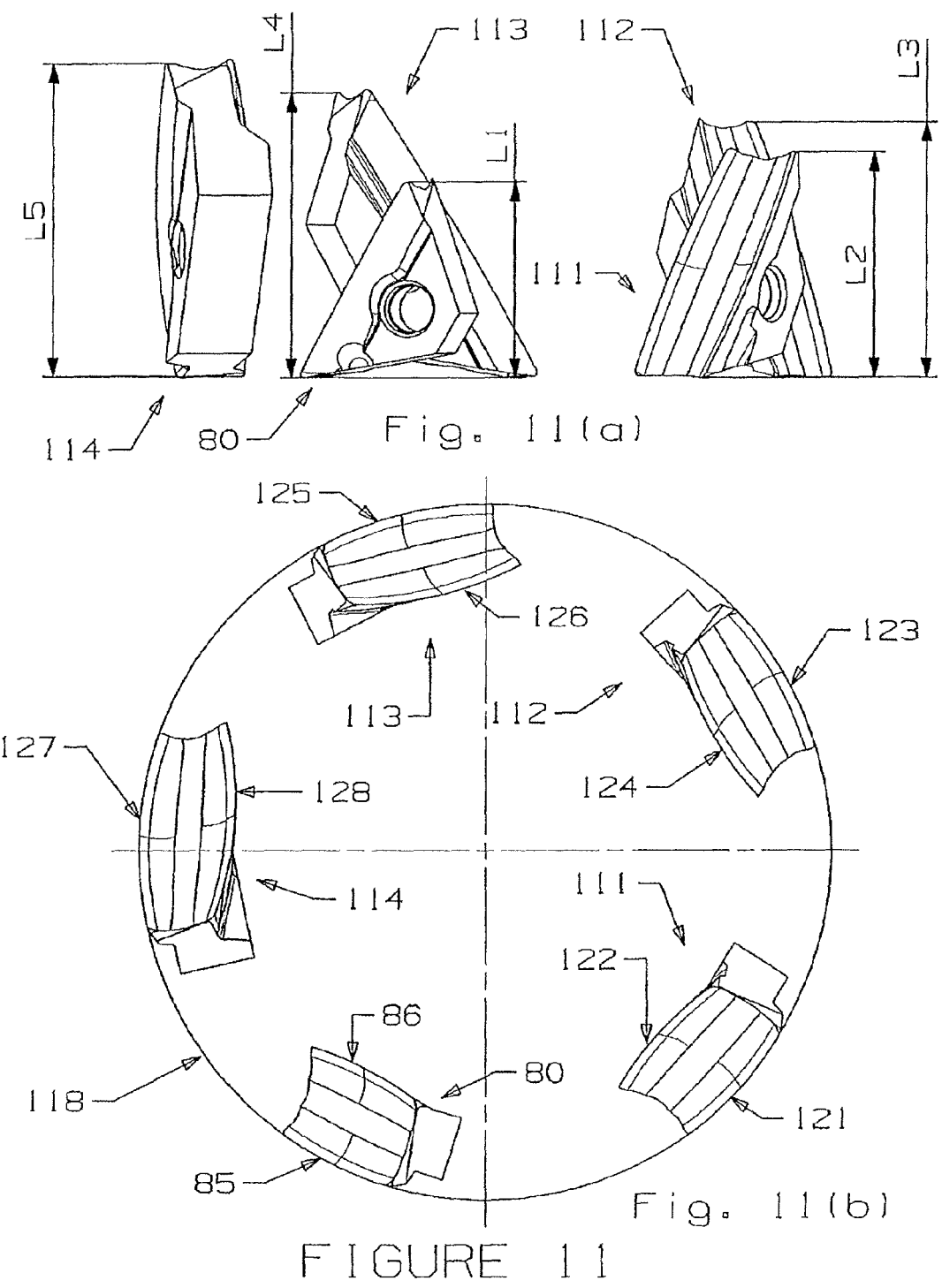
Figure 12:
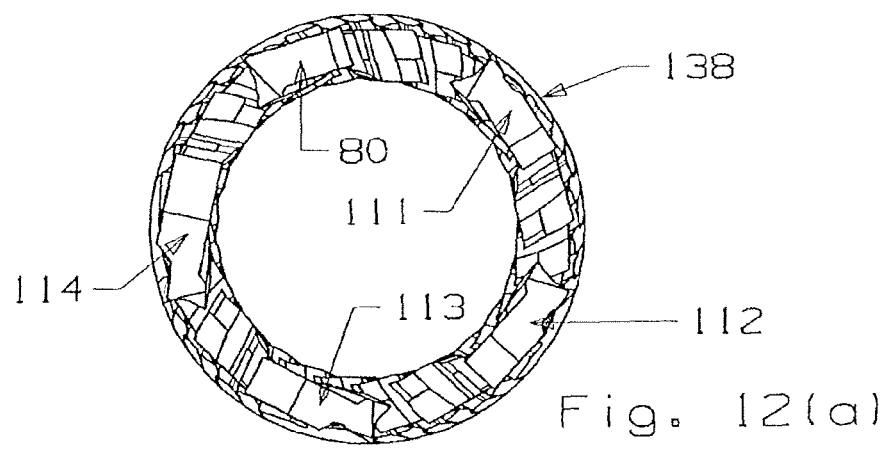
Figure 12:
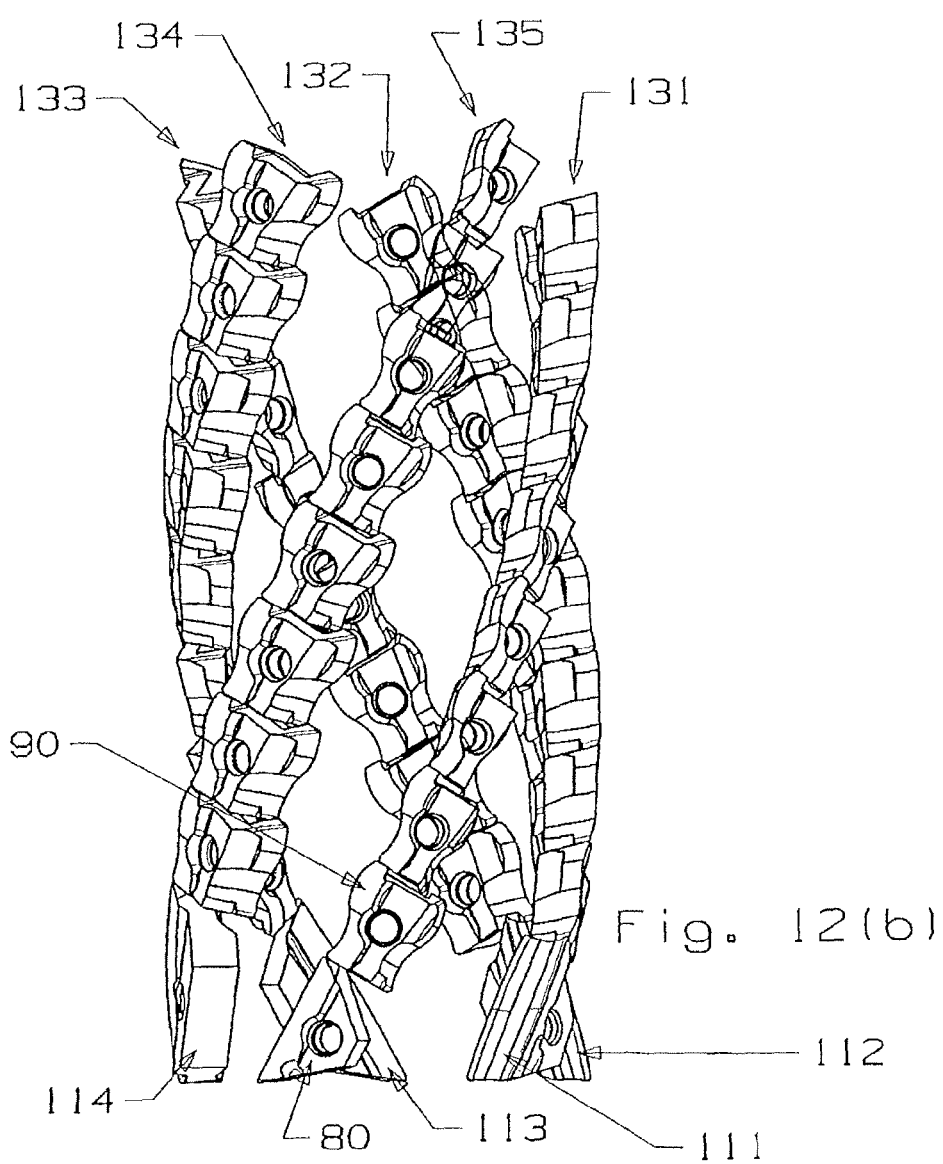

A plurality of cutting flutes, each flute comprising an aligned assembly of off-set common cutting inserts, is shown in FIG. 12(b). In various non-limiting embodiments, residual material left by a leading cutting flute may be cut and/or removed by a trailing cutting flute because of the off-set established by end-face cutting inserts that have different shapes and/or dimensions. For example, end-face cutting inserts 80 and 111-114 in FIGS. 11 and 12 are commonly-shaped and differently-dimensioned (i.e., having different lengths L1-L5 as shown in FIG. 11(a)). The different length cutting edges of the end-face cutting inserts 80 and 111-114 effectively off-set the junctions (and, therefore, any gaps due to rounded nose corners, or in some cases due to the geometric constraints of cutting inserts) between adjacent cutting inserts comprising the cutting flutes.

In various non-limiting embodiments, it may be desirable for the cutting inserts comprising each respective cutting flute to completely overlap (i.e., not be longitudinally off-set) between each adjacent cutting flute. In other words, the junctions between the constituent cutting inserts of the cutting flutes are aligned in a plane perpendicular to the longitudinal cutting axis of a rotary cutting tool system. By adjusting the values of the Q and K parameters in Equation (13), an arrangement of the assembly of common cutting inserts and, optionally, the end-face cutting inserts, may be defined for a rotary cutting tool system comprising at least one cutting flute comprising at least one assembly of common cutting inserts, wherein the individual inserts and the cutting flute comprise sinusoidal and helical cutting edges.

Figure 13:
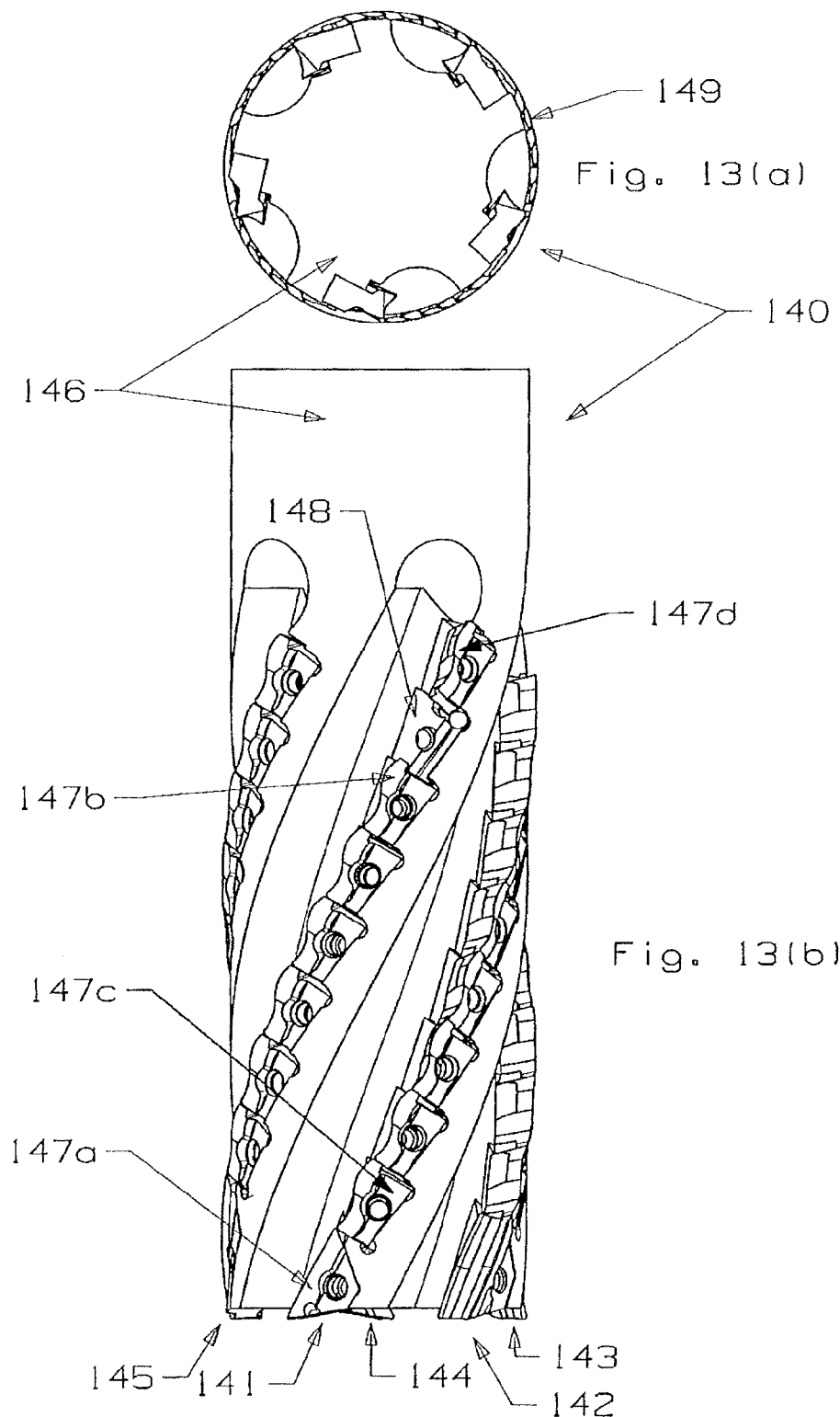

FIGS. 13(a) and 13(b) show two views of a cutting tool system 140 comprising a tool holder 146 and five cutting flutes 141-145, each cutting flute comprising a different-sized end-face cutting insert (e.g., cutting insert 147a) and a series of common cutting inserts (e.g., cutting insert 147b), and each cutting flute 141-145 also comprising a sinusoidal and helical cutting edge. The tool holder 146 comprises five series of common insert pockets (e.g., insert pocket 148), each series of common insert pockets positioned in a helical orientation about a longitudinal axis of the tool holder 146. A plurality of common cutting inserts are removably attachable to the common insert pockets in the tool holder 146 to form five cutting flutes 141-145 on the tool holder. In some embodiments, the insert pockets for the first common cutting insert (e.g., cutting insert 147c) and the last common cutting insert (e.g., cutting insert 147d) may be slightly different in geometry from the rest due to the fact that the first insert pocket for a first common cutting insert adjoins the insert pocket for an end-face cutting insert and the last insert pocket for a last common cutting insert ends at the proximal end of the flute. The five cutting flutes each comprise a helical grouping of the common cutting inserts positioned in the insert pockets. The common cutting inserts each comprise at least one sinusoidal and helical cutting edge. The five cutting flutes 141-145 each comprise a sinusoidal and helical cutting edge positioned about the longitudinal axis of the tool holder 146 and formed by the alignment of the individual sinusoidal and helical cutting edges of the common cutting inserts that comprise the five cutting flutes.

The five cutting flutes 141-145 shown in FIG. 13(b) each comprise a different-sized end-face cutting insert having at least one indexable helical cutting edge. The five cutting flutes 141-145 also comprise multiple common cutting inserts, the cutting inserts having sinusoidal and helical cutting edges that are aligned to form the sinusoidal and helical cutting edges of the cutting flutes. As shown in FIG. 13(a), the workpiece-engaging cutting edges of the cutting inserts (and, therefore, the cutting edges of the cutting flutes) are located on the cylindrical surface 149 representing the cutting diameter/radius of the cutting tool system. As shown in FIG. 13(b), the five different-sized end-face cutting inserts have a common longitudinal clearance, i.e., extend beyond the end face of the tool holder 146 by the same distance in the direction parallel to the longitudinal axis of the tool holder.

FIGS. 14(a)-14(c) show three views of a cutting insert 150 comprising four indexable cutting edges 151-154, each cutting edge comprising a sinusoidal and helical geometric shape. The cutting insert 150 comprises a center through-hole 155 for mounting and securing the cutting insert to a tool holder (not shown). The cutting insert 150 also comprises a top side 156 and a bottom side 157. The four indexable, sinusoidal, and helical cutting edges 151-154 are located on the top side 156 of the cutting insert 150. The cutting insert 150 possesses 90-degree rotational symmetry about the central axis of the through-hole 155.

Figure 14:
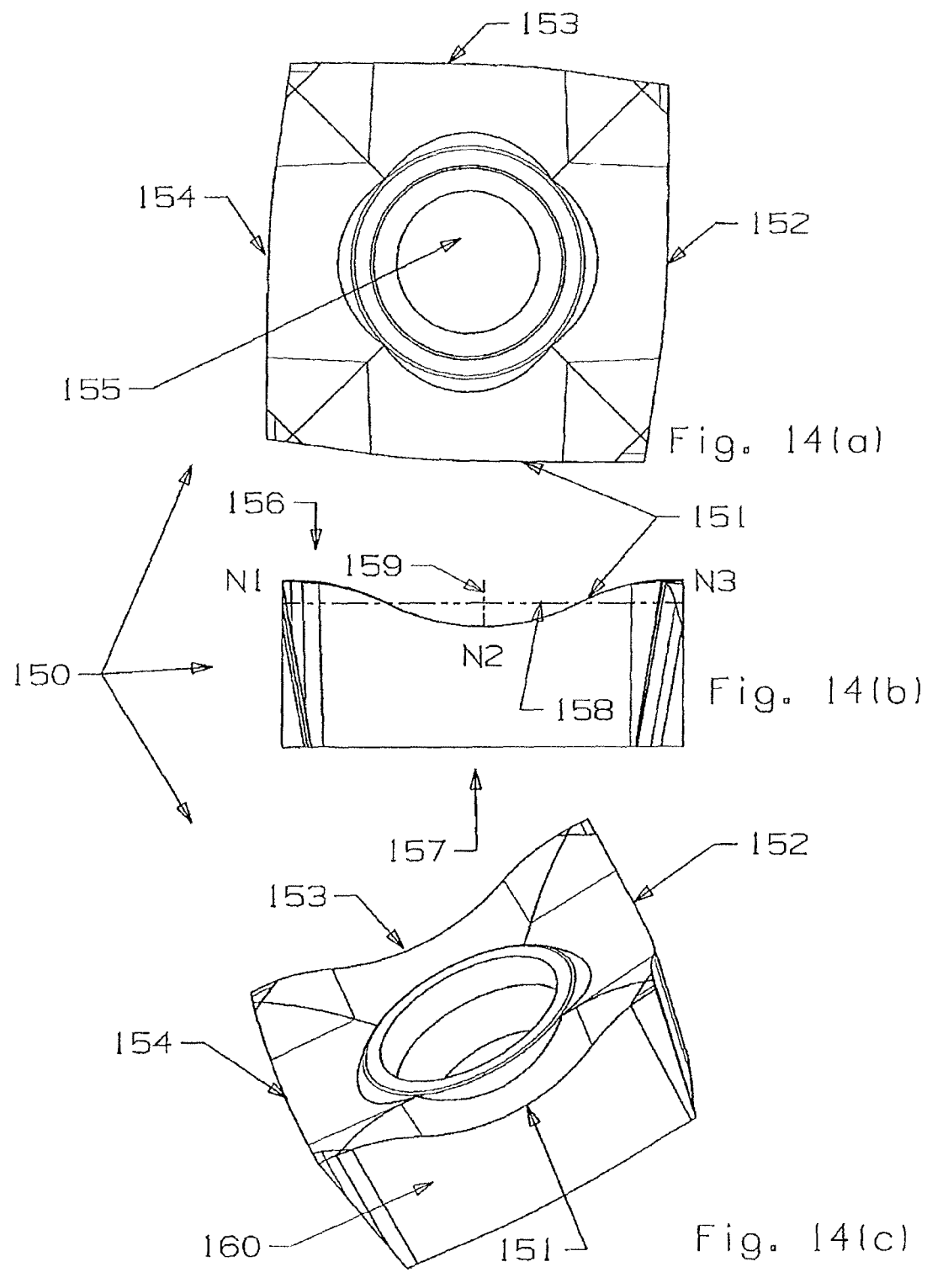

The four sinusoidal and helical cutting edges 151-154 of the cutting insert 150 are indexable by rotating the insert 90-degrees about the central axis of the through-hole 155. As shown in FIG. 14(b), the cutting edge 151 from point N1 through N2 to N3 is a one-wavelength sinusoidal curve, wherein line 158 is the longitudinal mean line axis of the sinusoidal curve, and the line 159 is the vertical axis of the sinusoidal curve. In some embodiments, the existing sinusoidal cutting edge 151 shown in FIG. 14 may be in an alternative shape being mirrored via the longitudinal mean line 158, that is, a sinusoidal cutting edge with its sole peak point positioned along the vertical line 159 but above the longitudinal line 158 of sinusoidal the curve.

FIGS. 15(a)-15(c) are schematic diagrams illustrating the geometric positioning of the cutting insert 150 relative to an XYZ coordinate system as if the cutting insert were secured to a rotary tool holder (not shown). FIG. 15(a) is a side view schematic diagram of the cutting insert 150 as positioned on the tool holder with the longitudinal axis 164 of the sinusoidal cutting edge 151 forming a helix angle Ha with the longitudinal cutting axis 163 of a cutting tool system, which is co-linear with the Y-axis of the XYZ coordinate system. FIG. 15(c) is a perspective view schematic diagram of the cutting insert 150 as viewed along the direction of the Y-axis (i.e., along the cutting axis 163) as shown in FIG. 15(a). FIG. 15(c) illustrates that the entire sinusoidal and helical cutting edge 151 is located on the cylindrical surface 166 defined by the cutting radius R4, wherein the cutting axis 163 is centered at the origin O in FIG. 15(c). Therefore, the sinusoidal and helical cutting edges 151-154 of the cutting insert 150 produce an accurate cutting path defined by the cutting radius R4 centered at the cutting axis 163. The design model and equations that define the sinusoidal and helical cutting edges 151-154 of the cutting insert 150 are developed using the same design method described above in connection with Equations (1)-(9).

Figure 16:
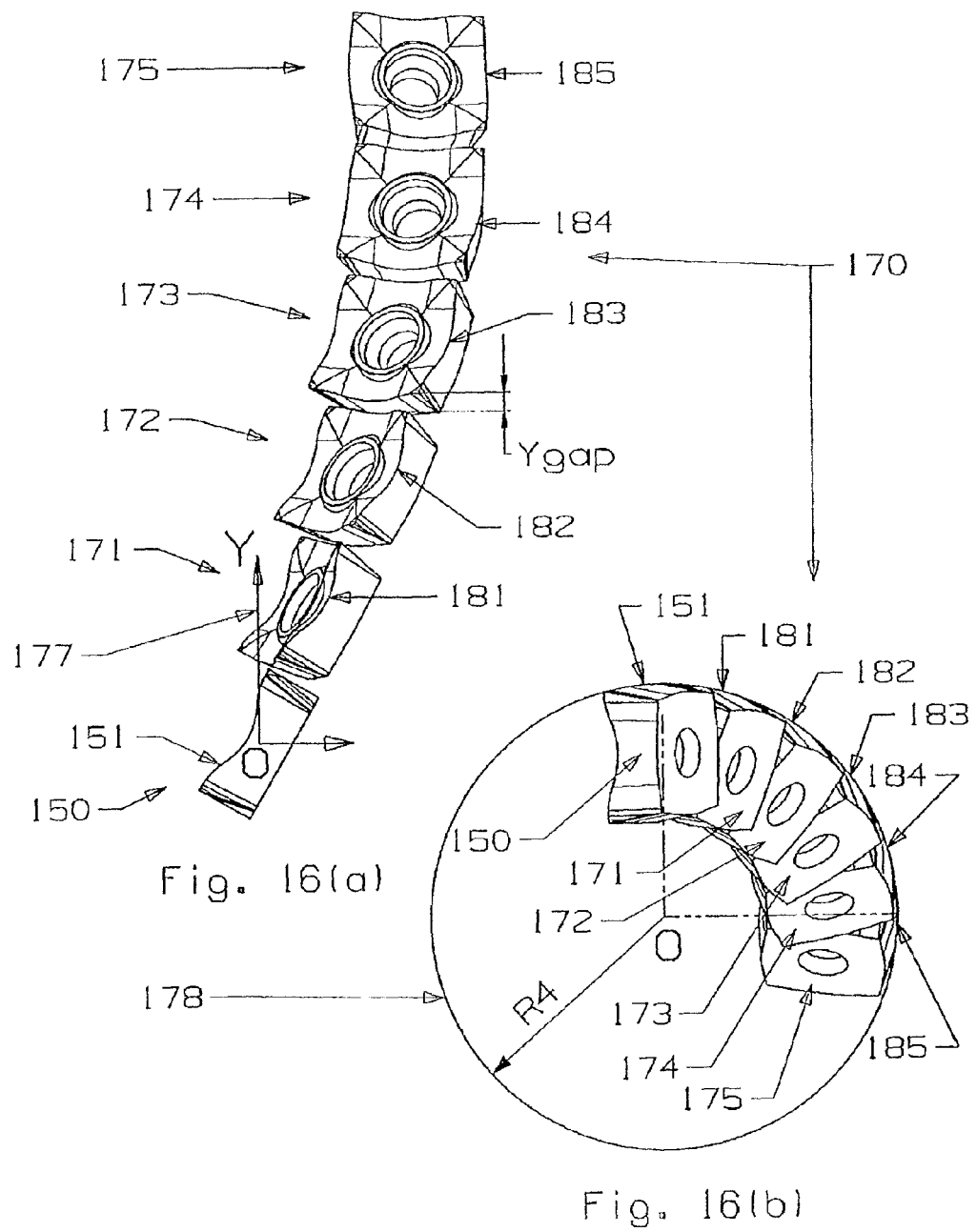

FIGS. 16(a) and 16(b) are schematic diagrams illustrating the relative positioning of a series of common cutting inserts 150 and 171-175, positioned as if the cutting inserts were assembled and secured to a rotary tool holder (not shown) to form a cutting flute 170 comprising the series of common cutting inserts and comprising a sinusoidal and helical cutting edge formed by the aligned sinusoidal and helical cutting edges of the series of common cutting inserts. The common cutting inserts 150 and 171-175 each comprise four indexable, sinusoidal, and helical cutting edges (e.g., cutting edges 151 and 181-185 on cutting inserts 150 and 171-175, respectively). Although a different end-face cutting insert is not shown in FIG. 16, it is understood that the embodiment illustrated in FIG. 16 may further comprise a different end-face cutting insert. The design model and equations that define the positioning of the cutting inserts 150 and 171-175 to form a cutting flute comprising a sinusoidal and helical cutting edge formed by the indexable, sinusoidal, and helical cutting edges 151 and 181-185 (including the positioning of a different end-face cutting insert, not shown) are developed using the same design method described above in connection with Equations (10)-(13).

The longitudinal cutting axis 177 of the rotary cutting tool system comprising the cutting inserts 150 and 171-175 is co-linear with the Y-axis of the XYZ coordinate system. The sinusoidal and helical cutting edge of the cutting flute 170 formed from the aligned cutting edges 151 and 181-185 of the individual cutting inserts 150 and 171-175, respectively, includes gaps between the adjacent cutting inserts that comprise the cutting flute. For example, a gap labeled Ygap in FIG. 16(a) is shown between the cutting edges 182 and 183 of cutting inserts 172 and 173, respectively, of the cutting flute 170. As shown in FIG. 16(b), notwithstanding the gap between adjacent cutting inserts, the workpiece-engaging cutting edges 151 and 181-185, which form the sinusoidal and helical cutting edge of the cutting flute 170, are located on the cylindrical surface 178 defined by a cutting radius R4 centered at the origin O, wherein the cutting axis 177 is also centered at the origin O.

The gap between the adjacent cutting inserts of a cutting flute may be compensated for by longitudinally offsetting the cutting inserts relative to adjacent cutting flutes, as described above. For example, a trailing cutting flute comprising an assembly of common cutting inserts may be longitudinally offset along the Y-axis relative to a leading cutting flute. In other words, the gaps between the constituent cutting inserts of the cutting flutes are not aligned in a plane perpendicular to the longitudinal cutting axis of a rotary cutting tool system comprising the cutting flutes.

Figure 17:
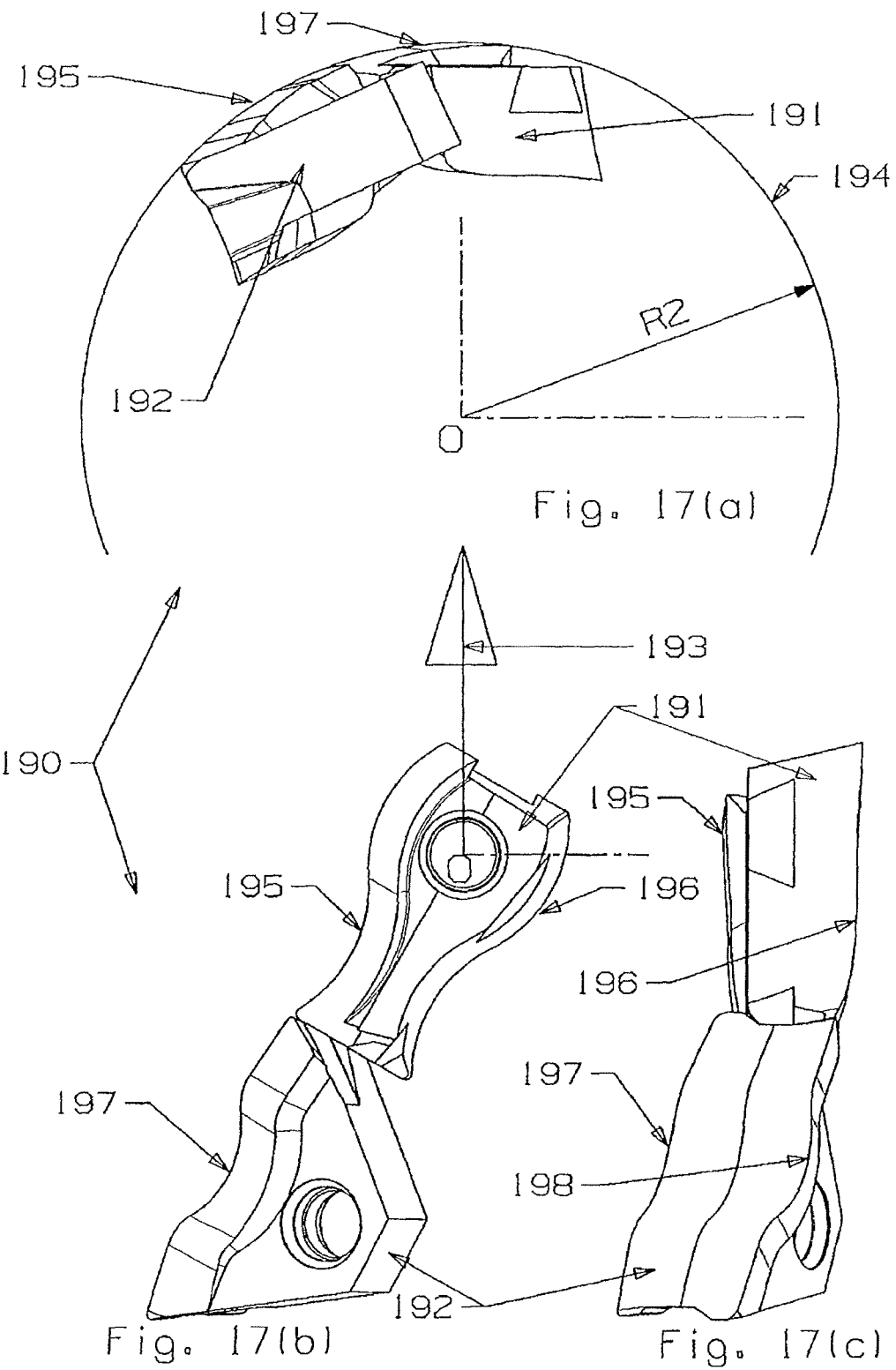

FIGS. 17(a) and 17(b) are schematic diagrams illustrating the relative positioning of a common cutting insert 191 having two indexable cutting edges 195 and 196, and a different end-face cutting insert 192 having two indexable cutting edges 197 and 198, positioned as if the cutting inserts were assembled and secured to a rotary tool holder (not shown) to form a cutting flute 190 comprising the cutting inserts and also forming a cutting edge having a sinusoidal and helical geometric shape. The cutting edges 195-198 are sinusoidal and helical cutting edges. The workpiece-engaging cutting edge 195 of the common cutting insert 190 is defined and positioned using a design model derived using the design method described above in connection with Equations (1)-(9). The cutting inserts are positioned to form a cutting flute comprising a sinusoidal and helical cutting edge using a design model derived using the design method described above in connection with Equations (10)-(13). As shown in FIG. 17(a), the work-piece engaging cutting edges 197 and 195, which form the sinusoidal and helical cutting edge of the cutting flute 190, are located on the cylindrical surface 194 defined by a cutting radius R2 centered at the origin O, wherein the longitudinal cutting axis 193 is also centered at the origin O.

Figure 18:
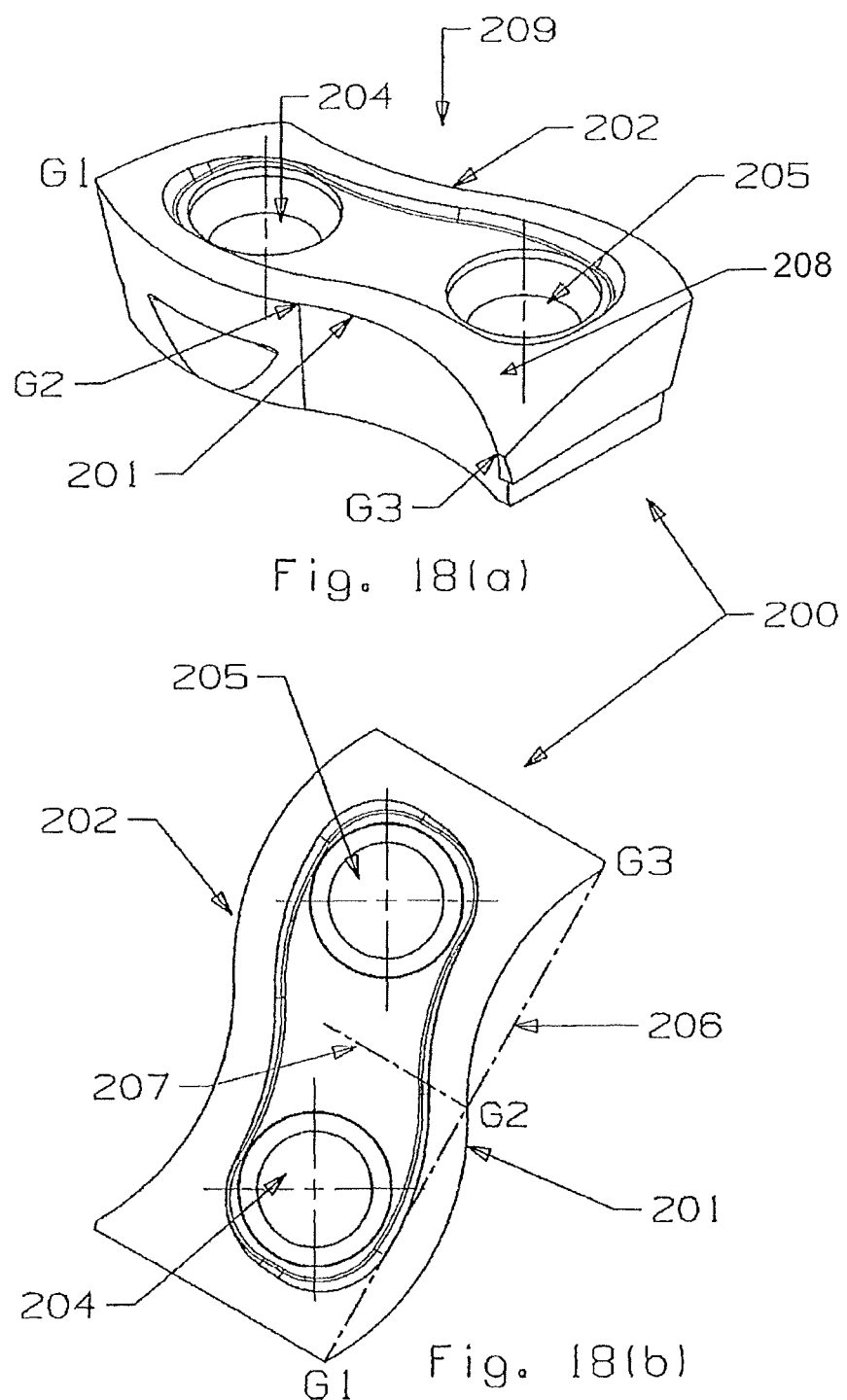

FIGS. 18(a) and 18(b) are two views of a cutting insert 200 comprising two indexable cutting edges 201 and 202, each cutting edge having a sinusoidal and helical geometric shape. The cutting insert 200 comprises two through-holes 204 and 205 for securing the cutting insert to a tool holder (not shown). As shown in FIG. 18(b), the cutting edge 201 from point G1 through G2 to G3 comprises a one-wavelength sinusoidal curve in which line 206 is the longitudinal mean line axis of the sinusoidal curve, and the line 207 is the vertical axis of the sinusoidal curve. As shown in FIG. 18(a), the sinusoidal curve passing through points G1, G2, and G3 follows a helical surface 208 on the top side 209 of the cutting insert 200.

FIGS. 19(a) and 19(b) show two views of a cutting insert 210 comprising two indexable cutting edges 211 and 212, each cutting edge having a sinusoidal and helical shape. The cutting insert 210 comprises a center through-hole 215 for securing the cutting insert to a tool holder (not shown). As shown in FIG. 19(b), the cutting edge 210 from point H1 through H2 to H3 comprises a one-wavelength sinusoidal curve in which line 216 is the longitudinal mean line axis of the sinusoidal curve, and the line 217 is the vertical axis of the sinusoidal curve. As shown in FIG. 19(a), the sinusoidal curve passing through points H1, H2, and H3 follows a helical surface 218 on the top side 219 of the cutting insert 210.

Figure 20:
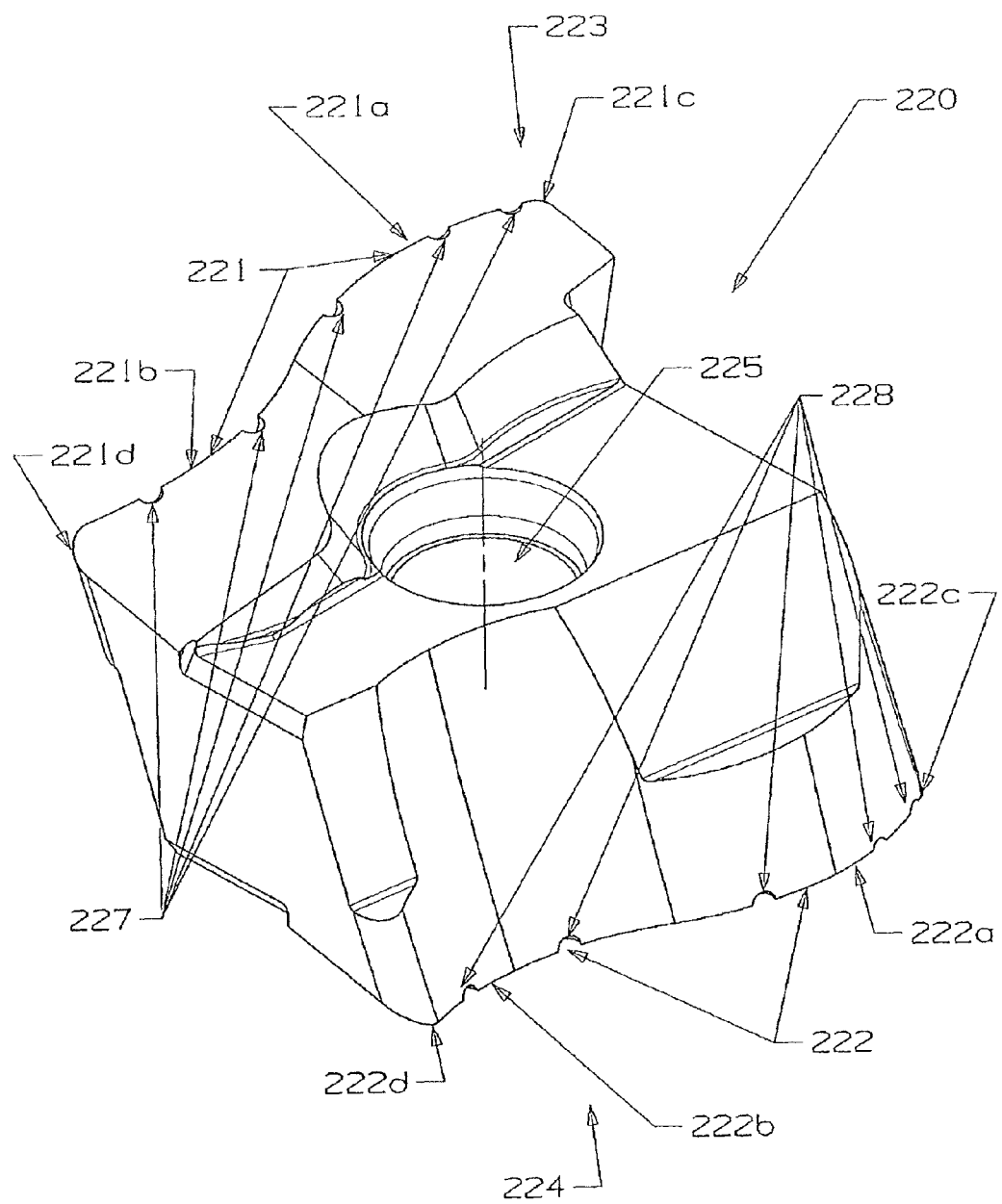
FIG. 20 is a three-dimensional perspective view of a cutting insert similar to the cutting insert shown in FIGS. 1-6 and 8 and comprising two indexable sinusoidal and helical cutting edges and notches positioned along the cutting edges.

FIG. 20 is a three-dimensional perspective view of a cutting insert 220 (similar to the cutting insert shown in FIGS. 1-6 and 8) comprising two indexable, sinusoidal, and helical cutting edges 221 and 22, and further comprising notches 227 and 228 positioned along the cutting edges 221 and 222, respectively. The cutting insert 220 comprises a center through-hole 225 for securing the insert to a tool holder (not shown). The cutting edge 221 is located on the top side 223 of the cutting insert 220 and comprises cutting edges 221a and 221b, and nose corners 221c and 221d. The cutting edge 222 is located on the bottom side 224 of the cutting insert 220 and comprises cutting edges 222a and 222b, and nose corners 222c and 222d.

The nose corners 221c/221d and 222c/222d are formed from the initial sharp end points of the sinusoidal and helical cutting edges 221 and 222, respectively, in order to prevent the ends of the cutting edges of the cutting insert from being damaged during use in machining processes. The two sinusoidal and helical cutting edges 221 and 222 of the cutting insert 220 are indexable by rotating the insert 180-degrees about an axis perpendicular to the axis of the center through-hole 225 and parallel to the mean line of the sinusoidal curves of the cutting edges 221 and 222.

The notches 227 positioned along the cutting edge 221, and the notches 228 positioned along the cutting edge 222, may be in any geometric form or shape. In various non-limiting embodiments, the number of notches positioned in a cutting edge may be at least one, and in some embodiments, may range from 1 to 10 per cutting edge. In various non-limiting embodiments, notches may be uniformly distributed along a cutting edge or non-uniformly distributed along a cutting edge.

In various non-limiting embodiments, a cutting tool system comprises a tool holder and a plurality of common cutting inserts. The tool holder comprises a plurality of common insert pockets positioned in a helical orientation about a longitudinal axis of the tool holder. The plurality of common cutting inserts are removably attachable to the plurality of common insert pockets in the tool holder. When so attached, the plurality of common cutting inserts form at least one cutting flute on the tool holder. The at least one cutting flute comprises a helical grouping of common cutting inserts positioned in the insert pockets. The common cutting inserts each comprise at least one sinusoidal and helical cutting edge. The at least one cutting flute comprises a sinusoidal and helical cutting edge positioned about the longitudinal axis of the tool holder. The sinusoidal and helical cutting edge of the cutting flute is formed by alignment of the individual sinusoidal and helical cutting edges of the common cutting inserts that comprise the at least one cutting flute.

In various non-limiting embodiments, a cutting tool system comprises a tool holder and a plurality of common cutting inserts. The tool holder comprises two or more series of common insert pockets. Each series of common insert pockets are positioned in a helical orientation about a longitudinal axis of the tool holder. The plurality of common cutting inserts are removably attachable to the common insert pockets in the tool holder. When so attached, the plurality of common cutting inserts form two or more cutting flutes on the tool holder. The two or more cutting flutes each comprise a helical grouping of the common cutting inserts positioned in the insert pockets. The common cutting inserts each comprise at least one sinusoidal and helical cutting edge. The two or more cutting flutes each comprise a sinusoidal and helical cutting edge positioned about the longitudinal axis of the tool holder. The sinusoidal and helical cutting edge of the cutting flute is formed by alignment of the individual sinusoidal and helical cutting edges of the common cutting inserts that comprise the two or more cutting flutes.

In various non-limiting embodiments, at least one sinusoidal and helical cutting edge of a common cutting insert may comprise a shape of one sinusoidal wavelength. In various non-limiting embodiments, a cutting insert may comprise two or more sinusoidal and helical cutting edges that are indexable in insert pockets in a tool holder, such as, for example, comprising two sinusoidal and helical cutting edges or four (4) sinusoidal and helical cutting edges that are indexable in the insert pockets.

In various non-limiting embodiments, a cutting tool system may also comprise an end-face cutting insert removably attachable to an insert pocket positioned at an engaging end of a tool holder, the end-face cutting insert having a shape that is different than a shape of a plurality of common cutting inserts. In various non-limiting embodiments, an end-face cutting insert may comprise a helical cutting edge that helically aligns with the sinusoidal and helical cutting edges of a plurality of common cutting inserts that form the sinusoidal and helical cutting edge of at least one cutting flute. In various non-limiting embodiments, an end-face cutting insert may comprise a sinusoidal and helical cutting edge that helically aligns with the sinusoidal and helical cutting edges of a plurality of common cutting inserts that form the sinusoidal and helical cutting edge of at least one cutting flute.

In various non-limiting embodiments, a cutting tool system may comprise adjacent helical groupings of common cutting inserts that are offset relative to each other along the longitudinal axis of a tool holder so that the inserts comprising adjacent helical cutting flutes are not longitudinally aligned in a cross sectional plane perpendicular to the longitudinal axis. In various non-limiting embodiments, a cutting tool system may comprise two or more differently-sized end-face cutting inserts that are positioned in respective insert pockets with a common longitudinal clearance, so that adjacent helical groupings of the common cutting inserts are offset relative to each other along the longitudinal axis of the tool holder so that the inserts comprising adjacent helical flutes are not longitudinally aligned in a cross sectional plane perpendicular to the longitudinal axis.

The non-limiting embodiments described in this specification are directed to cutting inserts and cutting tool systems comprising sinusoidal and helical cutting edges. The embodiments described in this specification provide various advantages including, for example, improved cutting action and increased tool life as a result of sinusoidal cutting edge geometry, and improved machined surface finish and machining path accuracy as a result of helical cutting edge geometry. The cutting inserts described herein comprising a sinusoidal and helical cutting edge may be manufactured in various sizes and shapes, and configured for use in a variety of rotary machining applications. It is understood that cutting inserts produced in accordance with the embodiments described herein may include acceptable manufacturing tolerances in terms of size, shape, and other geometric parameters.

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. For instance, the cutting tool system disclosed in this specification comprising a plurality of common cutting inserts forming at least one sinusoidal and helical cutting edge may be designed to have differential helix, differential pitch or non equi-spaced cutting flutes, and the cutting inserts presented in this invention may have non-standard sinusoidal wave patterns, and correspondingly, there may be a second group of common cutting inserts that are different in geometry from the first group of common cutting inserts. Thus, it is contemplated and understood that this specification supports additional embodiments not expressly set forth herein. Such embodiments may be obtained, for example, by combining, modifying, or reorganizing any of the disclosed steps, components, elements, features, aspects, characteristics, limitations, and the like, of the various non-limiting embodiments described in this specification. In this manner, Applicants reserve the right to amend the claims during prosecution to add features as variously described in this specification, and such amendments comply with the requirements of 35 U.S.C. §112, first paragraph, and 35 U.S.C. §132(a).

What is claimed is:

1. A cutting tool system comprising:
   a tool holder comprising a plurality of common insert pockets positioned in a helical orientation about a longitudinal axis of the tool holder; and
   a plurality of common cutting inserts removably attachable to the plurality of common insert pockets in the tool holder to form at least one cutting flute on the tool holder, the at least one cutting flute comprising a helical grouping of common cutting inserts positioned in the insert pockets;
   wherein the common cutting inserts each comprise at least one sinusoidal and helical cutting edge having a first portion and a second portion, the first portion being continuous with the second portion such that the first and second portions extend from one end of the at least one sinusoidal and helical cutting edge to another end of the at least one sinusoidal and helical cutting edge, wherein the first portion has a one-half sinusoidal wavelength shape and the second portion has a one-half sinusoidal wavelength shape; and wherein the at least one cutting flute comprises a sinusoidal and helical cutting edge positioned about the longitudinal axis of the tool holder and formed by alignment of the individual sinusoidal and helical cutting edges of the common cutting inserts that comprise the at least one cutting flute.

2. The cutting tool system of claim 1, wherein the first portion and the second portion have the same amplitude.

3. The cutting tool system of claim 1, wherein the common cutting inserts each comprise two or more sinusoidal and helical cutting edges that are indexable in the insert pockets.

4. The cutting tool system of claim 1, wherein the common cutting inserts each comprise two sinusoidal and helical cutting edges that are indexable in the insert pockets.

5. The cutting tool system of claim 1, wherein the common cutting inserts each comprise four sinusoidal and helical cutting edges that are indexable in the insert pockets.

6. The cutting tool system of claim 1, further comprising an end-face cutting insert removably attachable to an insert pocket positioned at an engaging end of the tool holder, the end-face cutting insert having a shape that is different than a shape of the plurality of common cutting inserts.

7. The cutting tool system of claim 6, wherein the end-face cutting insert comprises a helical cutting edge that helically aligns with the sinusoidal and helical cutting edges of the plurality of common cutting inserts forming the sinusoidal and helical cutting edge of the at least one cutting flute.

8. The cutting tool system of claim 6, wherein the end-face cutting insert comprises a sinusoidal and helical cutting edge that helically aligns with the sinusoidal and helical cutting edges of the plurality of common cutting inserts forming the sinusoidal and helical cutting edge of the at least one cutting flute.

9. A cutting tool system comprising:
a tool holder comprising two or more series of common insert pockets, each series of common insert pockets positioned in a helical orientation about a longitudinal axis of the tool holder; and
a plurality of common cutting inserts removably attachable to the common insert pockets in the tool holder to form two or more cutting flutes on the tool holder, the two or more cutting flutes each comprising a helical grouping of the common cutting inserts positioned in the insert pockets;
wherein the common cutting inserts each comprise at least one sinusoidal and helical cutting edge having a first portion and a second portion, the first portion being continuous with the second portion such that the first and second portions extend from one end of the at least one sinusoidal and helical cutting edge to another end of the at least one sinusoidal and helical cutting edge, wherein the first portion has a one-half sinusoidal wavelength shape and the second portion has a one-half sinusoidal wavelength shape; and
wherein the two or more cutting flutes each comprise a sinusoidal and helical cutting edge positioned about the longitudinal axis of the tool holder and formed by alignment of the individual sinusoidal and helical cutting edges of the common cutting inserts that comprise the two or more cutting flutes.

10. The cutting tool system of claim 9, wherein the first portion and the second portion have the same amplitude.

11. The cutting tool system of claim 9, wherein the common cutting inserts each comprise two or more sinusoidal and helical cutting edges that are indexable in the insert pockets.

12. The cutting tool system of claim 9, wherein the common cutting inserts each comprise two sinusoidal and helical cutting edges that are indexable in the insert pockets.

13. The cutting tool system of claim 9, wherein the common cutting inserts each comprise four sinusoidal and helical cutting edges that are indexable in the insert pockets.

14. The cutting tool system of claim 9, wherein adjacent helical groupings of the common cutting inserts are offset relative to each other along the longitudinal axis of the tool holder so that the inserts comprising adjacent helical flutes are not longitudinally aligned in a cross sectional plane perpendicular to the longitudinal axis.

15. The cutting tool system of claim 9, further comprising two or more end-face cutting inserts, each end-face cutting insert being removably attachable to an insert pocket positioned at an engaging end of the tool holder helically aligned with one of the two or more series of common insert pockets, and each end-face cutting insert having a shape that is different than a shape of the plurality of common cutting inserts.

16. The cutting tool system of claim 15, wherein the two or more end-face cutting inserts each comprise a helical cutting edge that helically aligns with the sinusoidal and helical cutting edges of the plurality of common cutting inserts forming the sinusoidal and helical cutting edges of the two or more cutting flutes.

17. The cutting tool system of claim 15, wherein the two or more end-face cutting inserts each comprise a sinusoidal and helical cutting edge that helically aligns with the sinusoidal and helical cutting edges of the plurality of common cutting inserts forming the sinusoidal and helical cutting edges of the two or more cutting flutes.

18. The cutting tool system of claim 15, wherein the two or more end-face cutting inserts have the same shape, are differently sized, and are positioned in respective insert pockets with a common longitudinal clearance, so that adjacent helical groupings of the common cutting inserts are offset relative to each other along the longitudinal axis of the tool holder so that the inserts comprising adjacent helical flutes are not longitudinally aligned in a cross sectional plane perpendicular to the longitudinal axis.

19. A cutting insert comprising at least one sinusoidal and helical cutting edge having a first portion and a second portion, the first portion being continuous with the second portion such that the first and second portions extend from one end of the at least one sinusoidal and helical cutting edge to another end of the at least one sinusoidal and helical cutting edge, wherein the first portion has a one-half sinusoidal wavelength shape and the second portion has a one-half sinusoidal wavelength shape.

20. The cutting insert of claim 19, wherein the first portion and the second portion have the same amplitude.

21. The cutting insert of claim 19, wherein the cutting insert comprises two or more sinusoidal and helical cutting edges.

22. The cutting insert of claim 19, wherein the cutting insert comprises two sinusoidal and helical cutting edges.

23. The cutting insert of claim 19, wherein the cutting insert comprises four sinusoidal and helical cutting edges.

24. A method for producing a cutting tool system comprising:
- a tool holder comprising a plurality of common insert pockets positioned in a helical orientation about a longitudinal axis of the tool holder; and
- a plurality of common cutting inserts removably attachable to the plurality of common insert pockets in the tool holder to form at least one cutting flute on the tool holder, the at least one cutting flute comprising a helical grouping of common cutting inserts positioned in the insert pockets;
- wherein the common cutting inserts each comprise at least one sinusoidal and helical cutting edge having a first portion and a second portion, the first portion being continuous with the second portion such that the first and second portions extend from one end of the at least one sinusoidal and helical cutting edge to another end of the at least one sinusoidal and helical cutting edge, wherein the first portion has a one-half sinusoidal wavelength shape and the second portion has a one-half sinusoidal wavelength shape;

the method comprising:
- positioning a cutting insert having a sinusoidal-shaped cutting edge as if it were on the tool holder with a helix angle; and
- modifying the sinusoidal shape of the cutting edge of the cutting insert to coincide with a cylindrical surface defined by a cutting radius centered at a cutting axis of the cutting tool system.

25. The method of claim 24, further comprising:
- positioning a first common cutting insert having a sinusoidal-shaped cutting edge as if it were on a tool holder with a helix angle;
- positioning a second common cutting insert having a sinusoidal-shaped cutting edge as if it were on a tool holder with a helix angle;
- rotating the second common cutting insert about the cutting axis of the cutting tool system while maintaining a constant cutting radius defined by the cutting tool system; and
- translating the second cutting insert parallel to the cutting axis while maintaining the constant cutting radius defined by the cutting tool system.

26. The method of claim 25, further comprising:
- successively positioning a plurality of common cutting inserts having a sinusoidal-shaped cutting edge as if the cutting inserts were on a tool holder with a helix angle;
- successively rotating each of the plurality of common cutting insert about the cutting axis of the cutting tool system while maintaining the constant cutting radius defined by the cutting tool system; and
- successively translating each of the plurality of cutting inserts parallel to the cutting axis while maintaining the constant cutting radius defined by the cutting tool system.

27. The method of claim 24, further comprising:
- positioning a seating surface of a first insert pocket according to an assembly position of the first common cutting insert having a sinusoidal-shaped cutting edge as if the first cutting insert were on a tool holder with a helix angle;
- positioning a seating surface of a second insert pocket according to an assembly position of the second common cutting insert having a sinusoidal-shaped cutting edge as if the second cutting insert were on the tool holder with a helix angle;
- rotating the seating surface of the second insert pocket about the cutting axis of the cutting tool system while maintaining a constant cutting radius defined by the cutting tool system; and
- translating the seating surface of the second insert pocket parallel to the cutting axis while maintaining the constant cutting radius defined by the cutting tool system.

28. The method of claim 27, further comprising:
- positioning seating surfaces of a plurality of insert pockets according to assembly positions of a plurality of common cutting inserts having a sinusoidal-shaped cutting edge as if the plurality of common cutting inserts were on the tool holder with a helix angle;
- successively rotating each of the seating surfaces of the plurality of insert pockets about the cutting axis of the cutting tool system while maintaining the constant cutting radius defined by the cutting tool system; and
- successively translating each of the seating surfaces of the plurality of insert pockets parallel to the cutting axis while maintaining the constant cutting radius defined by the cutting tool system.

* * * * *